(12) United States Patent
Hung et al.

(10) Patent No.: US 7,969,528 B2
(45) Date of Patent: Jun. 28, 2011

(54) LIQUID CRYSTAL DISPLAY DEVICE, AND METHOD FOR ASSEMBLING THE SAME

(75) Inventors: Ming-Chuan Hung, Kowloon (CN);
Chun-Chang Chiu, Kowloon (CN);
Hsu-Cheng Yeh, Kowloon (CN);
Chuan-Fa Lee, Kowloon (CN); Yu-Lun Liu, Kowloon (CN)

(73) Assignee: Top Victory Investments Limited, Tsim Sha Tsui, Kowloon, Hong Kong (CN)

( * ) Notice: Subject to any disclaimer, the term of this patent is extended or adjusted under 35 U.S.C. 154(b) by 227 days.

(21) Appl. No.: 12/485,423

(22) Filed: Jun. 16, 2009

(65) Prior Publication Data
US 2009/0322981 A1   Dec. 31, 2009

(30) Foreign Application Priority Data

| Jun. 26, 2008 | (TW) | ................ | 97211314 U |
| Jul. 21, 2008 | (TW) | ................ | 97127651 A |
| Sep. 19, 2008 | (TW) | ................ | 97216920 U |
| Sep. 19, 2008 | (TW) | ................ | 97216921 U |
| Oct. 21, 2008 | (TW) | ................ | 97218761 U |
| Nov. 13, 2008 | (TW) | ................ | 97220321 U |
| Jan. 16, 2009 | (TW) | ................ | 98200780 U |

(51) Int. Cl.
*G02F 1/1333* (2006.01)
*G02F 1/1335* (2006.01)

(52) U.S. Cl. ................ 349/58; 349/61; 349/64; 349/65
(58) Field of Classification Search .................... 349/58, 349/61, 64, 65
See application file for complete search history.

(56) References Cited

U.S. PATENT DOCUMENTS

| 6,559,908 | B2 * | 5/2003 | Hiratsuka et al. ............. | 349/58 |
| 6,806,920 | B2 * | 10/2004 | Hayashi et al. ............... | 349/58 |
| 7,492,081 | B2 * | 2/2009 | Hori et al. ..................... | 313/112 |
| 7,573,540 | B2 * | 8/2009 | Katsuda et al. ............... | 349/58 |

* cited by examiner

*Primary Examiner* — Mike Qi
(74) *Attorney, Agent, or Firm* — Osha • Liang LLP

(57) ABSTRACT

A method for assembling a liquid crystal display device includes: a) assembling together a front frame, a liquid crystal panel and an optical plate unit in a dust-free environment to form a first unit in a manner that the liquid crystal panel closes an opening in the front frame and that a sealed state is established between the liquid crystal panel and the optical plate unit; b) assembling a circuit board to one side of a rear frame without requirement of a dust-free environment to form a second unit; c) assembling a light source to one of the first and second units; and d) interconnecting the first and second units without requirement of a dust-free environment in a manner that the light source is able to provide light to a light-entrance surface of the optical plate unit.

17 Claims, 24 Drawing Sheets

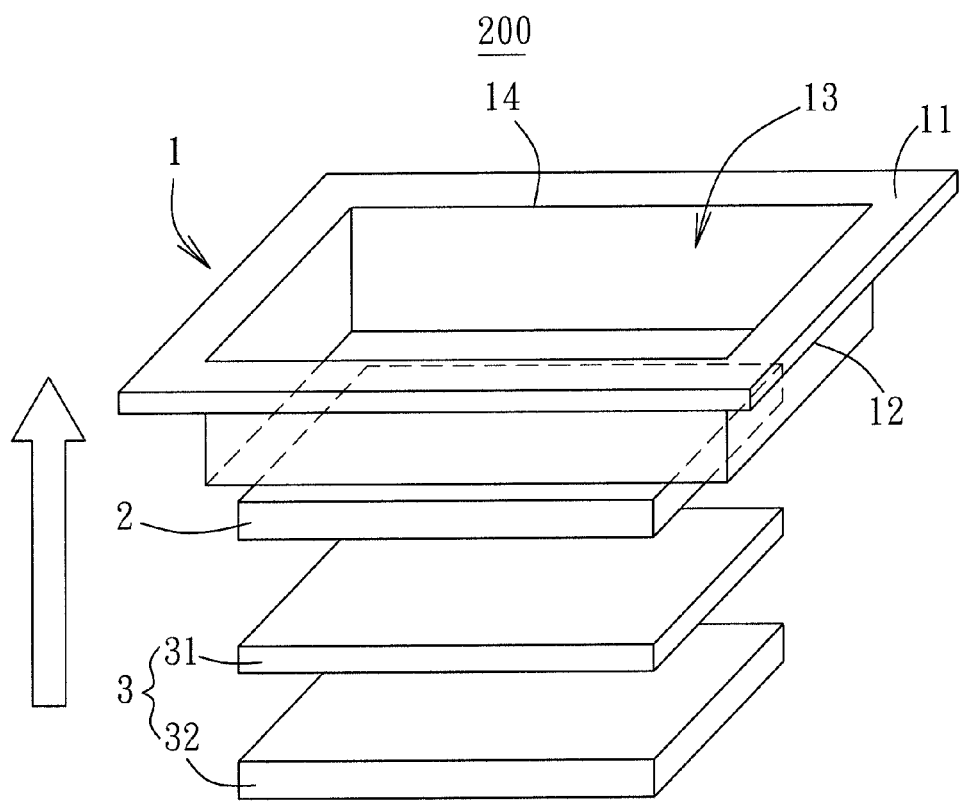
F I G. 4
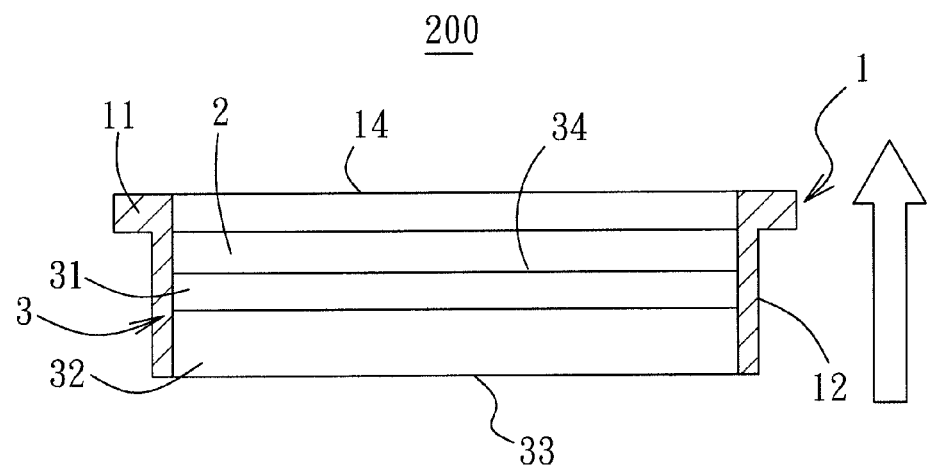
F I G. 5

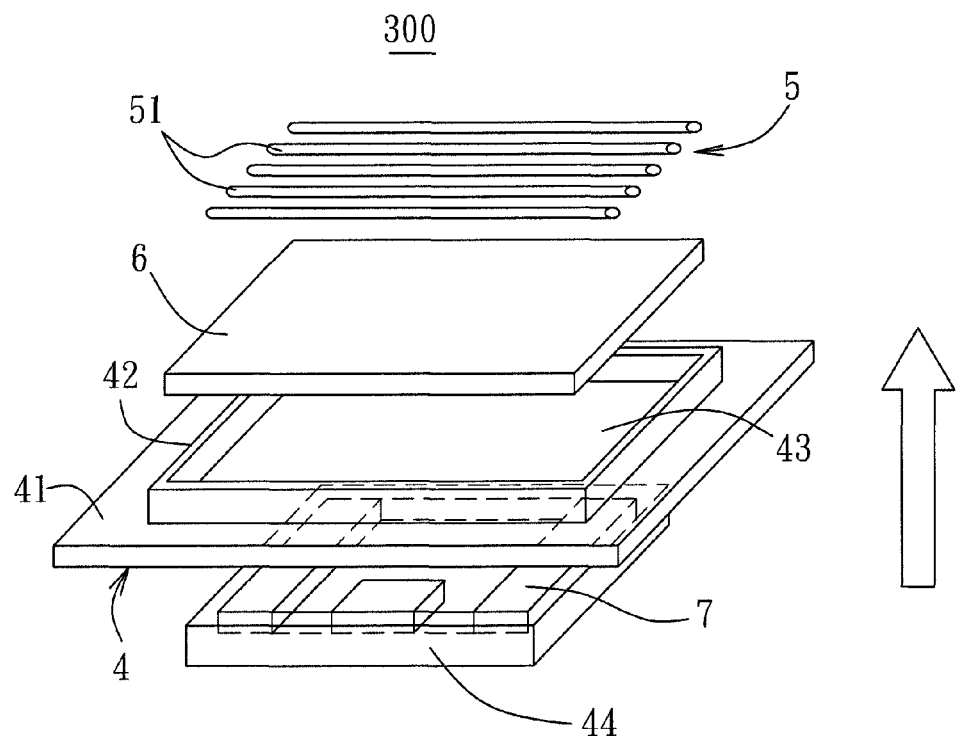
F I G. 6
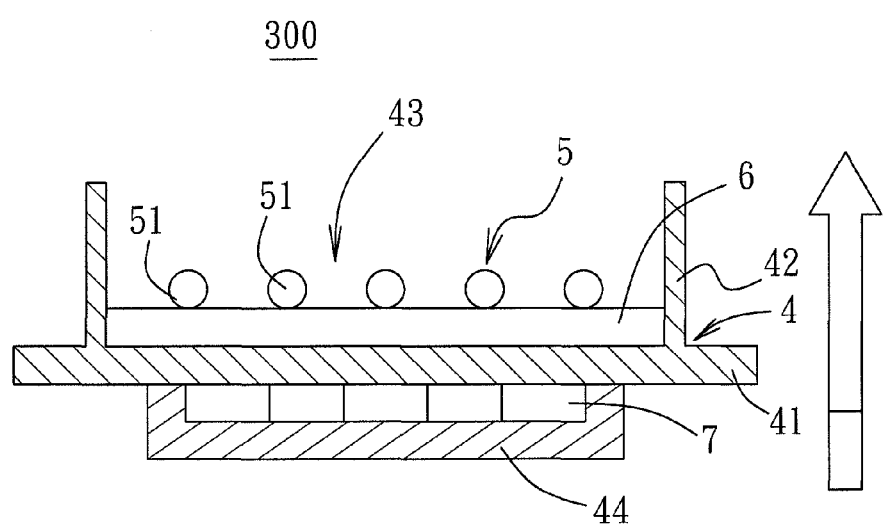
F I G. 7

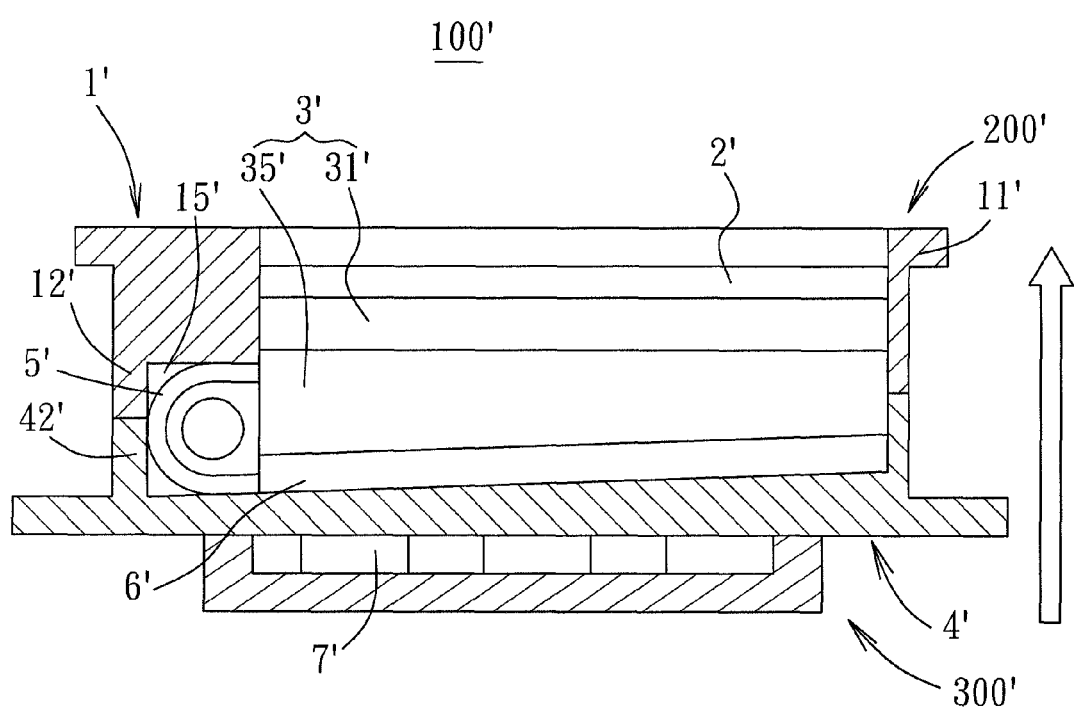
F I G. 8

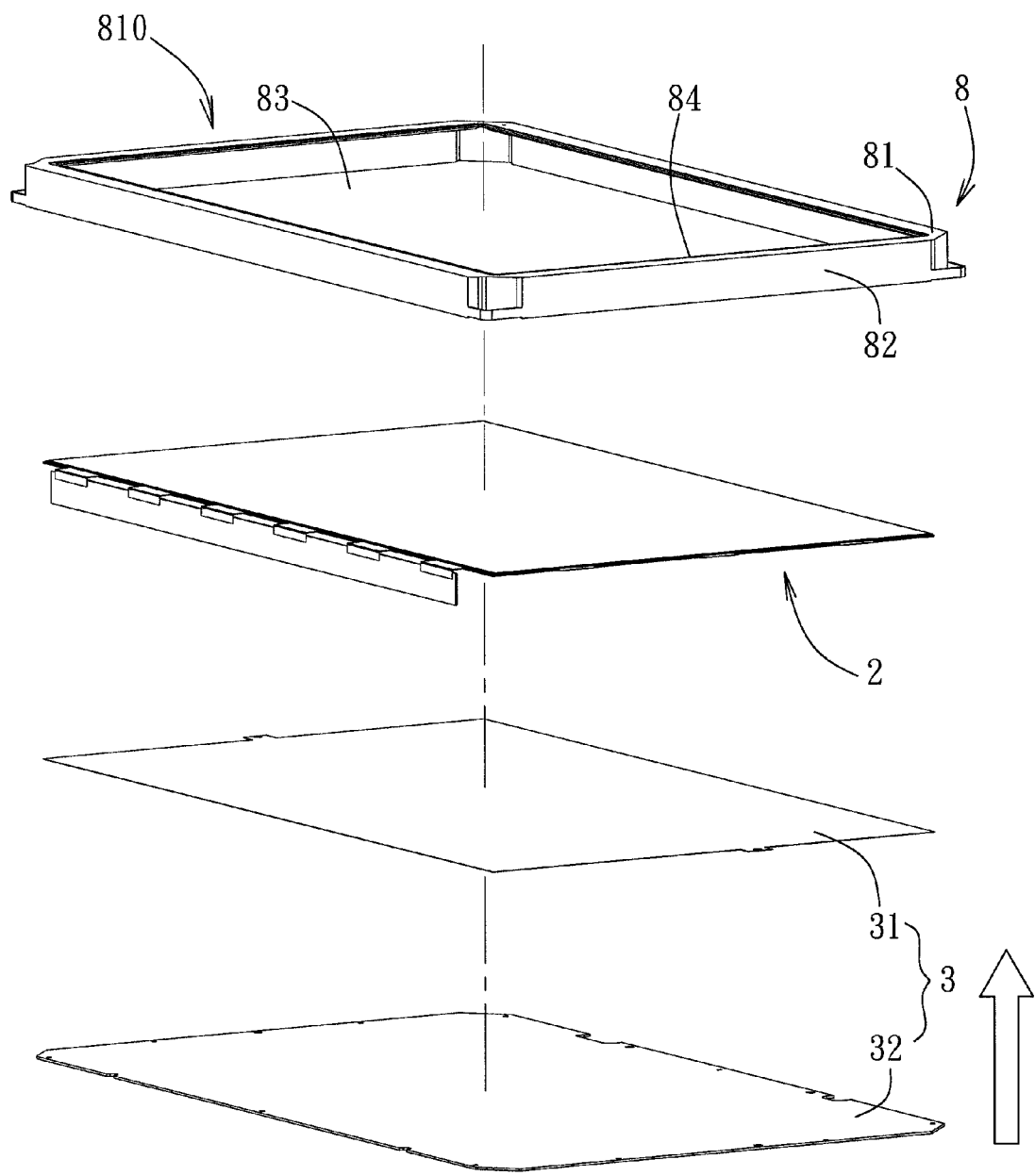
F I G. 23

LIQUID CRYSTAL DISPLAY DEVICE, AND METHOD FOR ASSEMBLING THE SAME

CROSS-REFERENCE TO RELATED APPLICATIONS

This application claims priority of Taiwanese Application No. 097216920, filed on Sep. 19, 2008, Taiwanese Application No. 097216921, filed on Sep. 19, 2008, Taiwanese Application No. 097220321, filed on Nov. 13, 2008, Taiwanese Application No. 097218761, filed on Oct. 21, 2008, Taiwanese Application No. 097211314, filed on Jun. 26, 2008, Taiwanese Application No. 097127651, filed on Jul. 21, 2008, and Taiwanese Application No. 098200780, filed on Jan. 16, 2009.

BACKGROUND OF THE INVENTION

1. Field of the Invention

The present invention relates to a liquid crystal display device and a method for assembling the same, more particularly to a liquid crystal display device assembled by directly assembling a front frame and optical components together, and a method for assembling the liquid crystal display device.

2. Description of the Related Art

During a process of assembling a liquid crystal display device, if there are unwanted particles between optical components, such as a liquid crystal panel, an optical film, or a diffuser plate, a production yield rate may be affected. Therefore, a liquid crystal module 92 as shown in FIG. 1 is assembled using an iron frame 921 (called as bezel), a plastic frame 923, and a back cover 928 to tightly combine a liquid crystal panel 922, an optical film 924, a diffuser plate 925, a light source device 926, and a reflective sheet 927 with each other in a dust-free environment at least with a level of Class-10000 (i.e., a number of particles with particle size that is greater than 0.5 µm is less than 10000 per 1 cubic ft.) according to US FED STD 209E to inhibit entry of the particles into the liquid crystal module 92. Then, as shown in FIG. 2, the liquid crystal module 92 is assembled with a front frame 91, a circuit board 93, a power source unit 94, a transformer 96, and a rear frame 95 to form a liquid crystal display device 9.

Since the above-mentioned liquid crystal display device 9 includes various components, an assembly process thereof is complex and time-consuming. Particularly, it is required to proceed with the assembly of the liquid crystal module 92 in a dust-free environment having a spacious production space. However, the larger the area encompassed by the dust-free environment, the higher will be the cost of manufacture, operation and maintenance. Therefore, an improvement of the assembly procedure of the liquid crystal display device 9 is being sought by those in the industry.

SUMMARY OF THE INVENTION

Therefore, an object of the present invention is to provide a method for assembling a liquid crystal display device by directly assembling a front frame and optical components together so as to prevent contamination therebetween.

According to one aspect of the invention, a method for assembling a liquid crystal display device includes:

a) assembling together a front frame, a liquid crystal panel and an optical plate unit in a dust-free environment so as to form a first unit, the front frame being configured with an opening, the liquid crystal panel and the optical plate unit being disposed in sequence at one side of the front frame in a manner that the liquid crystal panel closes the opening in the front frame and that a sealed state is established between the liquid crystal panel and the optical plate unit, the optical plate unit having a light-entrance surface remote from the liquid crystal panel;

b) assembling a circuit board to one side of a rear frame without requirement of a dust-free environment so as to form a second unit;

c) assembling a light source to one of the first and second units; and d) interconnecting fixedly the first and second units without requirement of a dust-free environment in a manner that the light source is able to provide light to the light-entrance surface of the optical plate unit.

Another object of the present invention is to provide a liquid crystal display device assembled according to the method of this invention.

According to another aspect of the invention, a liquid crystal display device comprises:

a front frame including a front frame plate formed with an opening, and a first surrounding wall that extends from one side of the front frame plate, the front frame plate and the first surrounding wall cooperating to define a first space;

a liquid crystal panel that is received in the first space and that closes the opening in the front frame plate;

an optical plate unit that has a light-entrance surface and a light-exit surface and that is received in the first space in a manner that the light-exit surface faces the liquid crystal panel, a periphery of the optical plate unit forming a tight relationship with the first surrounding wall, the weight of one of the optical plate unit and the liquid crystal panel acting on the other one of the optical plate unit and the liquid crystal panel such that the light-exit surface and the liquid crystal panel are in a tight relationship at least at peripheral portions thereof;

a rear frame that is connected to one end of the first surrounding wall of the front frame, and that includes a main plate;

a circuit board disposed on one side of the main plate opposite to the front frame; and a light source disposed adjacent to the light-entrance surface for providing light toward the light-entrance surface.

A further object of the present invention is to provide a sub-assembly of the liquid crystal display device of this invention.

According to a further aspect of the invention, a sub-assembly of a liquid crystal display device comprises:

a front frame including a front frame plate formed with an opening, and a first surrounding wall that extends from one side of the front frame plate, the front frame plate and the first surrounding wall cooperatively defining a first space;

a liquid crystal panel that is received in the first space and that closes the opening in the front frame plate; and an optical plate unit that has a light-entrance surface and a light-exit surface and that is received in the first space in a manner that the light-exit surface faces the liquid crystal panel, a periphery of the optical plate unit forming a tight relationship with the first surrounding wall.

BRIEF DESCRIPTION OF THE DRAWINGS

Other features and advantages of the present invention will become apparent in the following detailed description of the preferred embodiments with reference to the accompanying drawings, of which:

FIG. 4 is an exploded perspective view of a first unit shown in FIG. 3;

FIG. 5 is a partly cross-sectional schematic view of the first unit shown in FIG. 4 after assembling;

FIG. 6 is an exploded perspective view of a second unit shown in FIG. 3;

FIG. 7 is a partly cross-sectional schematic view of the second unit shown in FIG. 6 after assembling;

FIG. 8 is a partly cross-sectional schematic view illustrating a second preferred embodiment of a method for assembling a liquid crystal display device according to the present invention, wherein the second preferred embodiment is used for assembling a side-light-type liquid crystal display device;

FIG. 23 is an exploded perspective view illustrating that the method for assembling the first unit as shown in FIG. 4 is applied to assemble a first unit of a liquid crystal module;

DETAILED DESCRIPTION OF THE PREFERRED EMBODIMENTS

Figure 3:
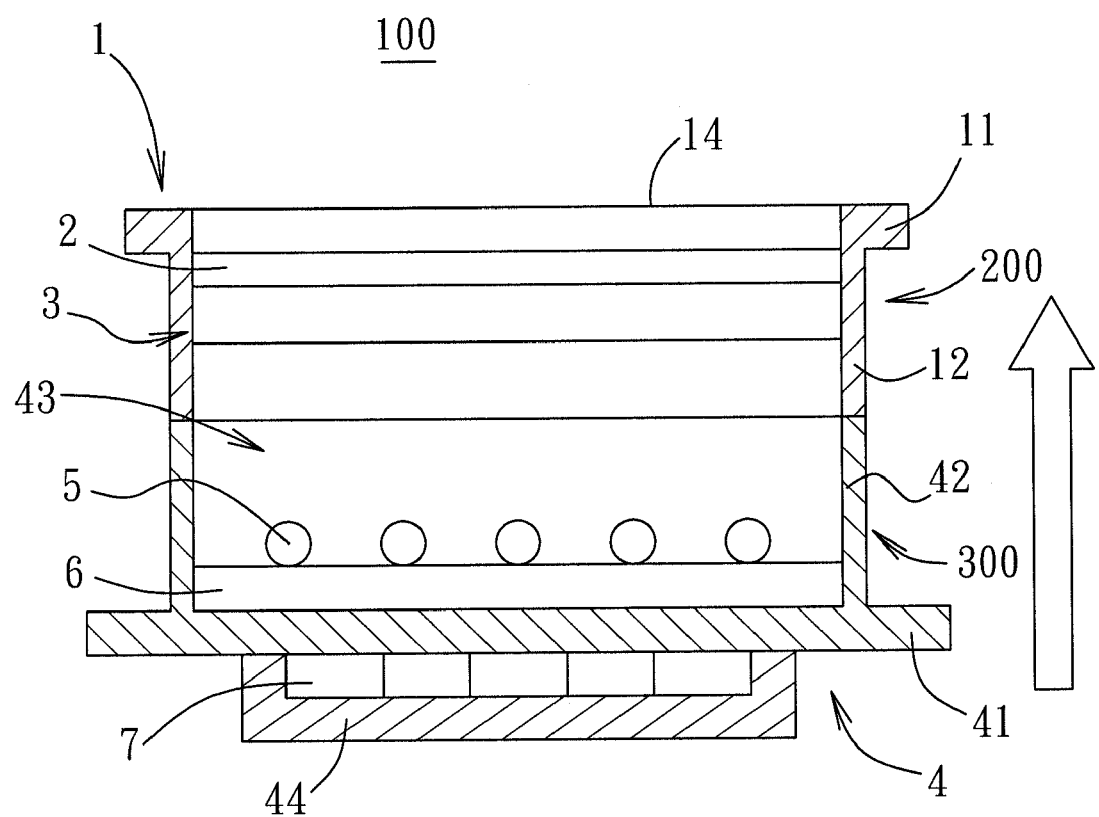
FIG. 3 is a partly cross-sectional schematic view illustrating a first preferred embodiment of a method for assembling a liquid crystal display device according to the present invention, wherein the first preferred embodiment is used for assembling a direct-light-type liquid crystal display device.

Referring to FIG. 3, a first preferred embodiment of a method for assembling a liquid crystal display device according to the present invention is provided to illustrate assembly of a direct-light-type liquid crystal display (LCD) device 100. Basically, two major parts of the LCD device 100, i.e., a first unit 200 and a second unit 300, are separately assembled.

Assembly of the first unit 200 is illustrated with reference to FIGS. 3 to 5. For convenience of illustration, a direction indicated by arrows in the accompanying drawings is a front direction. First, a front frame 1 is provided in a dust-free environment for assembling the first unit 200. The front frame 1 includes a front frame plate 11 formed with an opening 14, and a first surrounding wall 12 that extends backwardly from an inner periphery of the front frame plate 11. The front frame plate 11 and the first surrounding wall 12 cooperate to define a first space 13 in spatial communication with the opening 14. Then, a liquid crystal panel 2 and an optical plate unit 3 are disposed in the first space 13 in sequence, and are assembled together with the front frame 1 to form the first unit 200 as shown in FIG. 5. It should be noted that a thickness of the optical plate unit 3 is enlarged in the accompanying drawings to facilitate illustration of a relationship between the optical plate unit 3 and other components of the first unit 200. The above-mentioned assembly sequence can be conducted in reverse, i.e., the liquid crystal panel 2 is stacked on the optical plate unit 3, and then the front frame 1 is sleeved on the combination of the liquid crystal panel 2 and the optical plate unit 3.

In this embodiment, as an example, the optical plate unit 3 includes an optical film 31 adjacent to the liquid crystal panel 2, and a diffuser plate 32 that is remote from the liquid crystal panel 2 compared to the optical film 31. One side (rear side) of the diffuser plate 32 remote from the optical film 31 is formed with a light-entrance surface 33. One side (front side) of the optical film 31 facing the liquid crystal panel 2 is formed with a light-exit surface 34. The light-exit surface 34 is substantially parallel and fittingly attached to the liquid crystal panel 2, and the light-entrance surface 33 is substantially parallel to the light-exit surface 34. Light enters the optical plate unit 3 through the light-entrance surface 33, and is diffused by the diffuser plate 32 and homogenized or brightness-enhanced by the optical film 31, and then enters the liquid crystal panel 2 through the light-exit surface 34.

A periphery of the above-mentioned diffuser plate 32 and the first surrounding wall 12 are in a tight relationship with each other. Further, the liquid crystal panel 2 closes the opening 14 in the front frame plate 11. Thus, a sealed state is established between the liquid crystal panel 2 and the optical plate unit 3 so as to prevent entry of contaminants therebetween. The tight relationship as called herein can be an interference fit. Since specifics of the interference fit can be readily appreciated by those skilled in the art, detail thereof will be omitted herein for the sake of brevity. The optical film 31 can be one of a brightness enhancement film, a prism sheet, and a diffuser film. The optical plate unit 3 can include a plurality of the optical films 31. In addition, the optical film 31 may be omitted in other embodiments of the invention. It should be noted that the above-mentioned diffuser plate 32 is different from the diffuser film of the optical film 31. The diffuser plate 32 is a relatively thick plate capable of supporting the optical film 31 and forming the tight relationship with the first surrounding wall 12. In practice, aside from establishing the tight relationship between the diffuser plate 32 and the first surrounding wall 12, it is also possible to establish a tight relationship between the light-exit surface 34 and the liquid crystal panel 2, or to directly seal peripheries of the optical plate unit 3 and the liquid crystal panel 2 together using a sealant. For example, the weight of one of the optical plate unit 3 and the liquid crystal panel 2 acts on the other one of the optical plate unit 3 and the liquid crystal panel 2 such that the light-exit surface 34 and the liquid crystal panel 2 are in the tight relationship. Any manner that can establish the sealed state between the liquid crystal panel 2 and the optical plate unit 3 is applicable in the present invention. When the sealed state between the peripheries of the optical plate unit 3 and the liquid crystal panel 2 is established, the first surrounding wall 12 can have only two side walls for positioning, and may even be omitted in other embodiments of the invention.

Assembly of the second unit 300 is illustrated with reference to FIGS. 3, 6 and 7. A rear frame 4 is provided. The rear frame 4 includes a main plate 41, and a second surrounding wall 42 projecting from a front side of the main plate 41. The main plate 41 and the second surrounding wall 42 cooperatively define a second space 43. Then, a light source 5, a reflective sheet 6, the rear frame 4, and a circuit board 7 are stacked and assembled in sequence to form the second unit 300 as shown in FIG. 7. The light source 5 and the reflective sheet 6 are received in the second space 43. Similarly, the above-mentioned assembly sequence can be conducted in reverse, i.e., the rear frame 4, the reflective sheet 6, and the light source 5 are stacked on the circuit board 7 in sequence. Since the effect of particles on the light source 5, the reflective sheet 6, and the circuit board 7 in minimal, the second unit 300 can be assembled without requirement of a dust-free environment. That is, the second unit 300 can be assembled under normal environment conditions.

In this embodiment, the above-mentioned light source 5 includes a plurality of cold cathode fluorescent lamps 51. The cold cathode fluorescent lamps 51 can be replaced by other illuminating components, such as light emitting diodes, in other embodiments of this invention. The circuit board 7 can be integrated with a power supply and a transformer (not shown). Additionally, a cover 44 can be further provided in a manner that the cover 44 covers the circuit board 7 for protecting the circuit board 7. Further, the cover 44 can be pivotably disposed on a rear side of the main plate 41.

Referring to FIGS. 3, 5 and 7, after the first unit 200 and the second unit 300 are separately pre-assembled, one end of the first surrounding wall 12 of the front frame 1 and one end of the second surrounding wall 42 of the rear frame 4 are fixedly interconnected by adhering, interlocking, or using screws to form the LCD device 100 as shown in FIG. 3.

Figure 1:
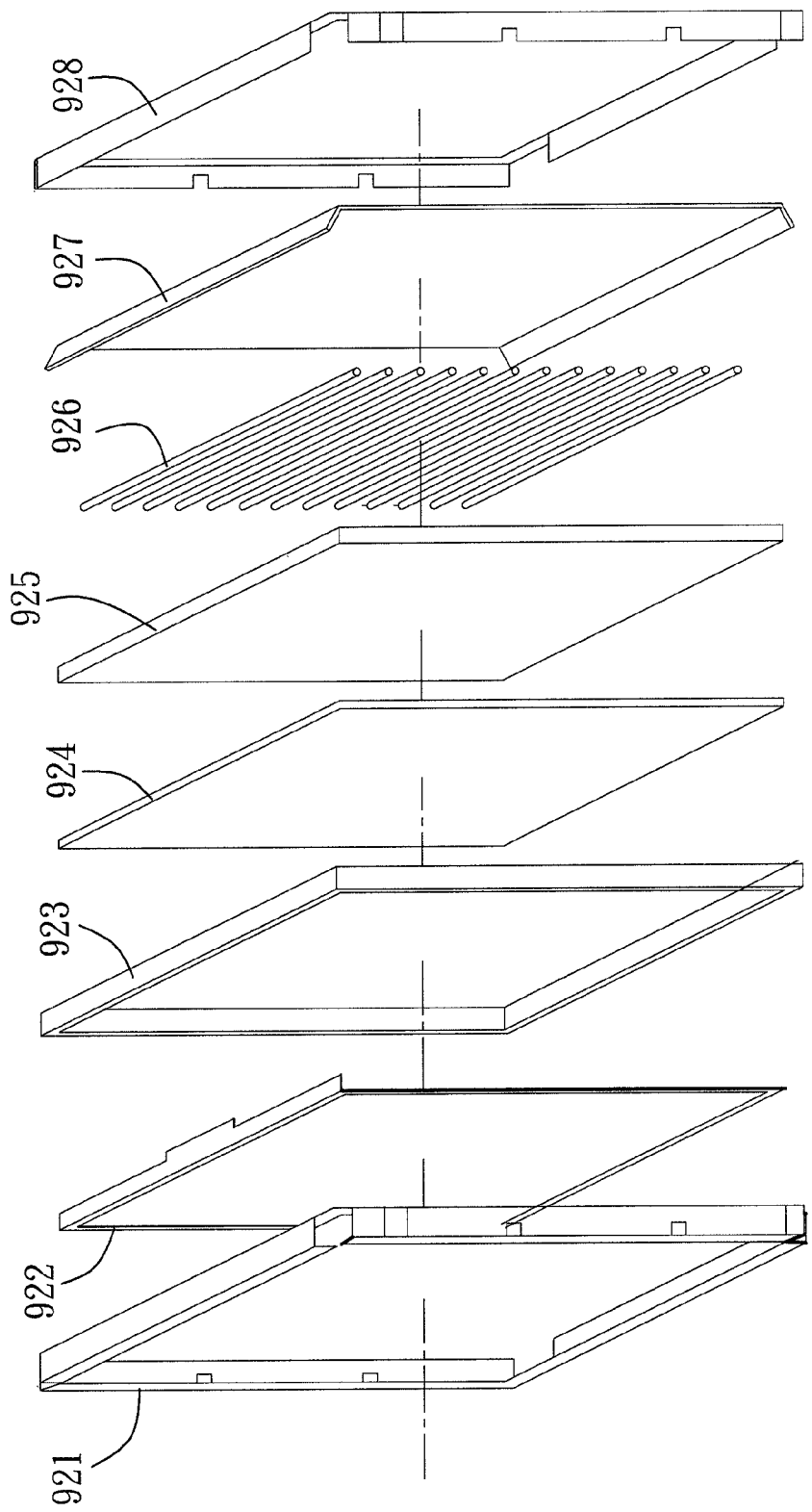
FIG. 1 is an exploded perspective view illustrating components of a conventional liquid crystal module.
Figure 2:
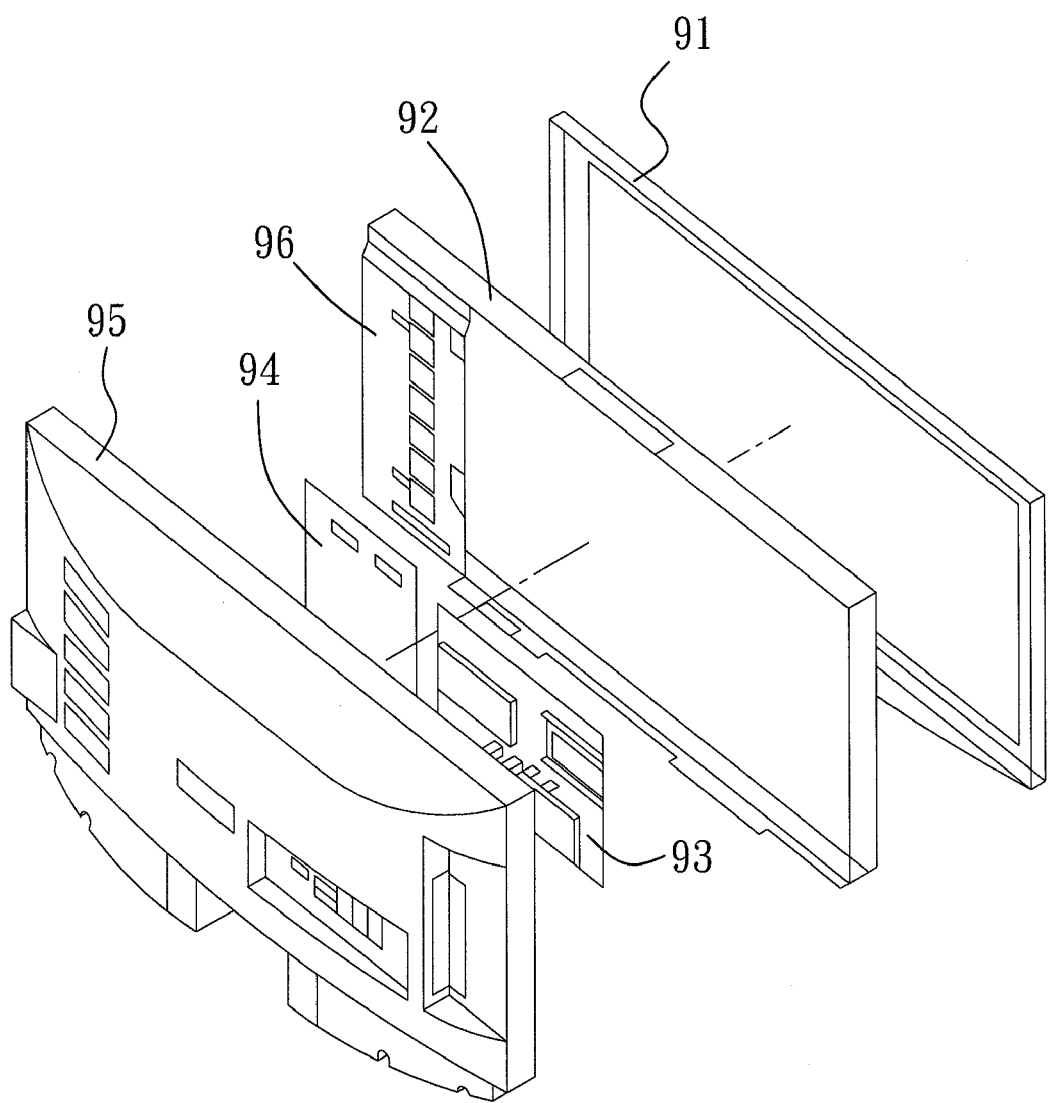
FIG. 2 is an exploded perspective view illustrating components of a conventional liquid crystal display device.

Concerning the above-mentioned assembly procedure, only the first unit 200 is assembled with a requirement of a dust-free environment. Regarding assembly of the second unit 300 and assembling the first and second units 200, 300 together, there is no requirement of a dust-free environment. Moreover, the first unit 200 only involves assembling together the front frame 1, the liquid crystal panel 2, and the optical plate unit 3. A required production space for the first unit 200 is relatively small, i.e., the dust-free environment for producing the LCD device 100 is not required to be as spacious as that for producing the conventional LCD device. Moreover, the present invention uses the front frame 1 and the rear frame 4 to assemble other components together. Compared with the conventional method, there is no requirement of an iron frame 921 and a plastic frame 923 (shown in FIG. 1). Even when the entire LCD device 100 is assembled in a dust-free environment, the required production space is still relatively small.

Referring to FIG. 8, a second preferred embodiment of the method for assembling a liquid crystal display device according to the present invention is provided to illustrate assembly of a side-light-type LCD device 100'.

Figure 9:
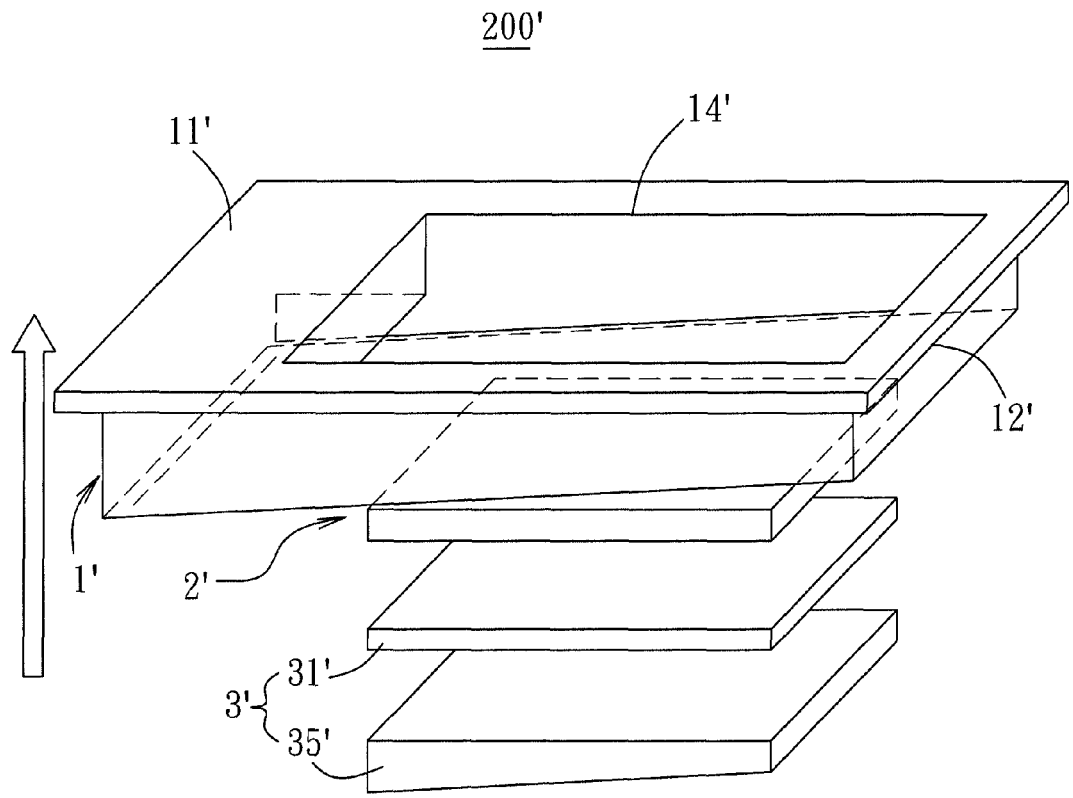
FIG. 9 is an exploded perspective view of a first unit shown in FIG. 8.
Figure 10:
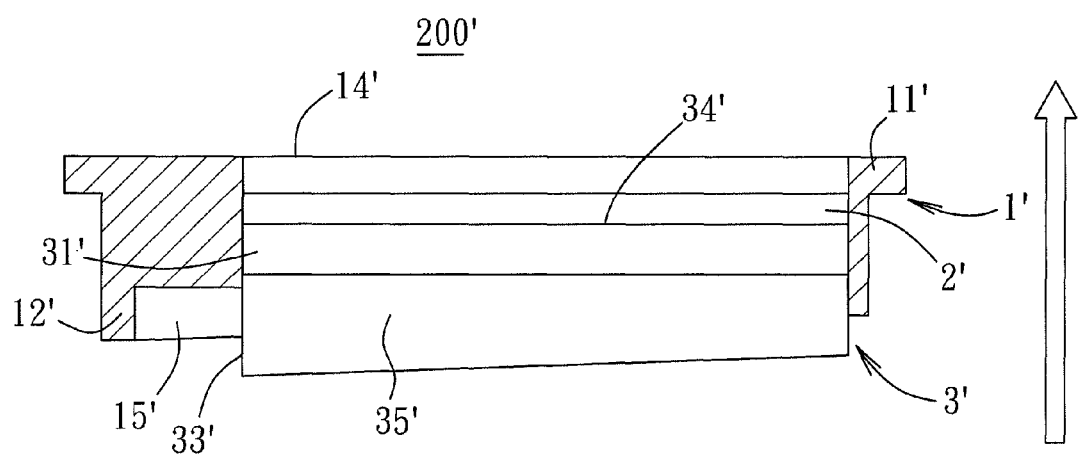
FIG. 10 is a partly cross-sectional schematic view of the first unit shown in FIG. 9 after assembling.

Assembly of the first unit 200' of this embodiment is illustrated first with reference to FIGS. 8 to 10. Components and the assembly method of the first unit 200' are generally similar to those of the first unit 200 of the first preferred embodiment. The difference resides in that the optical plate unit 3' includes an optical film 31' and a light-guiding plate 35'. A periphery of the light-guiding plate 35' and the first surrounding wall 12' are in a tight relationship with each other. Further, the liquid crystal panel 2' closes the opening 14' in the front frame plate 11' of the front frame 1'. Thus, a sealed state is similarly established between the liquid crystal panel 2' and the optical plate unit 3' so as to prevent entry of contaminant therebetween.

Moreover, the light-entrance surface 33' and the light-exit surface 34' of the optical plate unit 3' are different from the configuration of the first embodiment. The light-exit surface 34' is substantially parallel and fittingly attached to the liquid crystal panel 2', but the light-entrance 33' is substantially perpendicular to the light-exit surface 34' in this embodiment. An inner side of the first surrounding wall 12' adjacent to the light-entrance surface 33' is L-shaped, such that there is a clearance 15' between the light-entrance surface 33' and a part of the first surrounding wall 12' as shown in FIG. 10.

Figure 11:
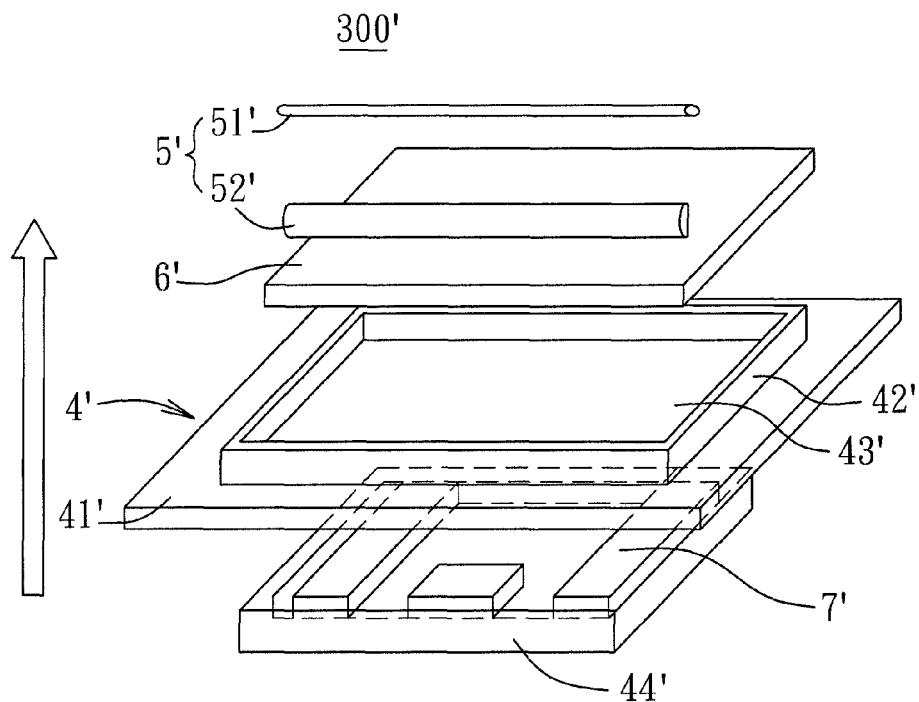
FIG. 11 is an exploded perspective view of a second unit shown in FIG. 8.
Figure 12:
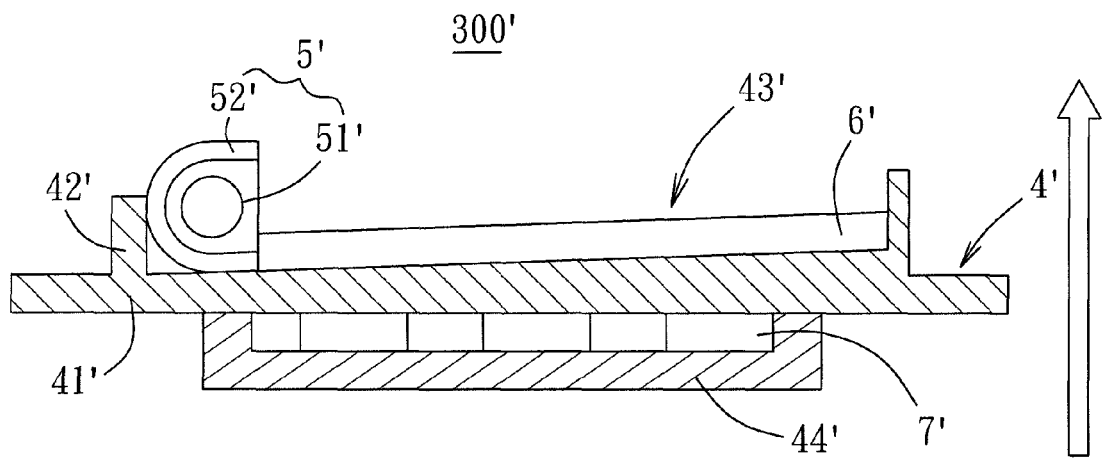
FIG. 12 is a partly cross-sectional schematic view of the second unit shown in FIG. 11 after assembling.

Assembly of the second unit 300' of this embodiment is illustrated with reference to FIGS. 8, 11 and 12. Components and the assembly method of the second unit 300' are generally similar to those of the second unit 300 of the first preferred embodiment. The difference is that the light source 5' of this embodiment includes a fluorescent tube 51' and a reflective cover 52'. Moreover, the light source 5' is not disposed on the reflective sheet 6' but between one side of the reflective sheet 6' and the second surrounding wall 42' of the rear frame 4', and a part of the light source 5' projects out of the second space 43'. When the first unit 200' and the second unit 300' that are separately assembled are interconnected to form the LCD device 100' as shown in FIG. 8, a part of the light source 5' is received in the clearance 15' between the light-entrance surface 33' and the first surrounding wall 12', and the light source 5' is capable of providing light toward the light-entrance surface 33'. Moreover, since the light source 5' of this embodiment provides light toward one side of the light-guiding plate 35', a bottom surface of the light-guiding plate 35' is an inclined surface (as shown in FIG. 10) to facilitate guiding of light. If the light source 5' includes a plurality of the fluorescent tubes 51' and the reflective covers 52', and provides light toward the light-guiding plate 35' from two or four sides of the latter, the bottom surface is preferably a horizontal surface. Since this can be readily appreciated by those skilled in the art, further details will be omitted herein for the sake of brevity.

Similarly, concerning the above-mentioned assembly procedure, only the first unit 200' is assembled with a requirement of a dust-free environment. Regarding assembly of the second unit 300' and assembling the first and second units 200', 300' together, there is no requirement of a dust-free environment. The second preferred embodiment can achieve the same effect as the first preferred embodiment.

Figure 13:
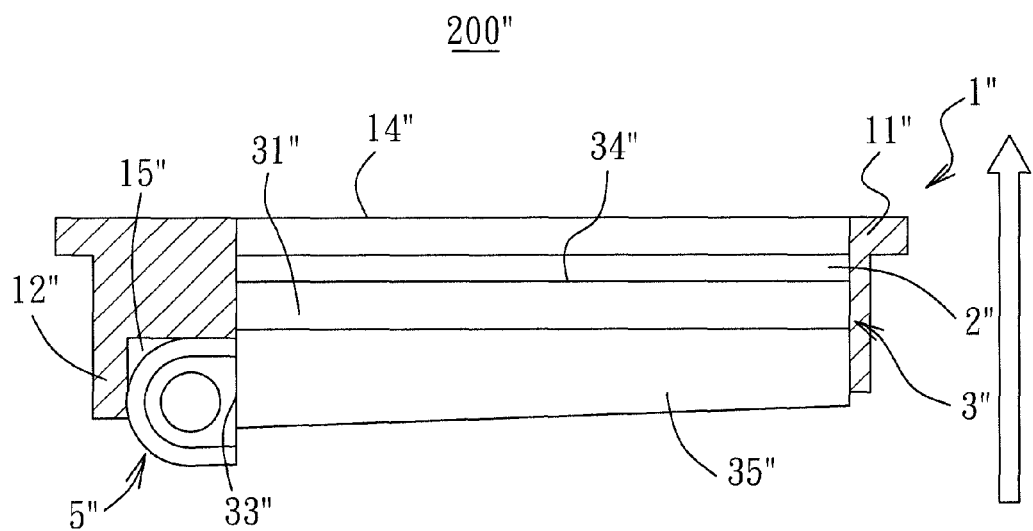
FIG. 13 is a partly cross-sectional schematic view illustrating a modification of the second preferred embodiment shown in FIG. 10, wherein a light source is received in a first space.
Figure 14:
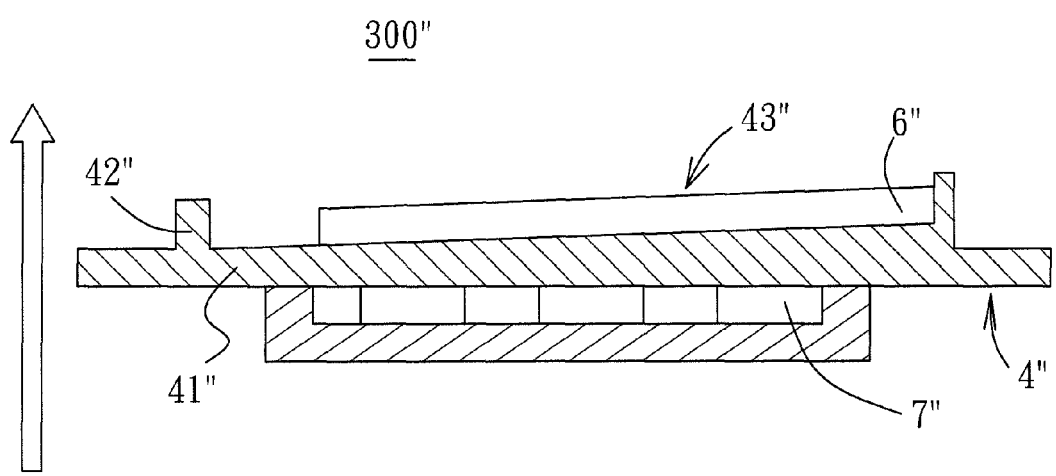
FIG. 14 is a partly cross-sectional schematic view illustrating the modification of the second preferred embodiment shown in FIG. 12, wherein the light source is not received in a second space.

In the following description, various modifications are provided for illustrating the present invention in more detail. First, FIGS. 13 and 14 show a first modification that is similar to the second preferred embodiment. The only difference is that the light source 5" is not disposed in the second unit 300" but in the first unit 200", i.e., the light source 5" is disposed in the clearance 15" between the light-entrance surface 33" and the first surrounding wall 12" of the first unit 200". The second unit 300" is formed by assembling only the rear frame 4", the reflective sheet 6", and the circuit board 7" together. However, the first unit 200" and the second unit 300" that are separately assembled also form the LCD device 100' as shown in FIG. 8 after they are interconnected. Similarly, the light source 5 of the first preferred embodiment can be disposed in the first unit 200, and the first unit 200 and the second unit 300 also form the LCD device 100 as shown in FIG. 3 after they are interconnected.

Besides the light source 5", the first surrounding wall 12, 12', 12" and the second surrounding wall 42, 42', 42" can also be modified. Referring to FIG. 3, since the first surrounding wall 12 and the second surrounding wall 42 are interconnected to form a unitary structure, the length of the first surrounding wall 12 can be lengthened to a total length of the first surrounding wall 12 and the second surrounding wall 42, such that the second surrounding wall 42 may be omitted from the rear frame 4. In this case, one end of the first surrounding wall 12 is disposed to abut against the main frame 41 when interconnecting the first unit 200 and the second unit 300. In this case, the reflective sheet 6 is directly attached to the front side of the main plate 41 that is remote from the circuit board 7.

Figure 15:
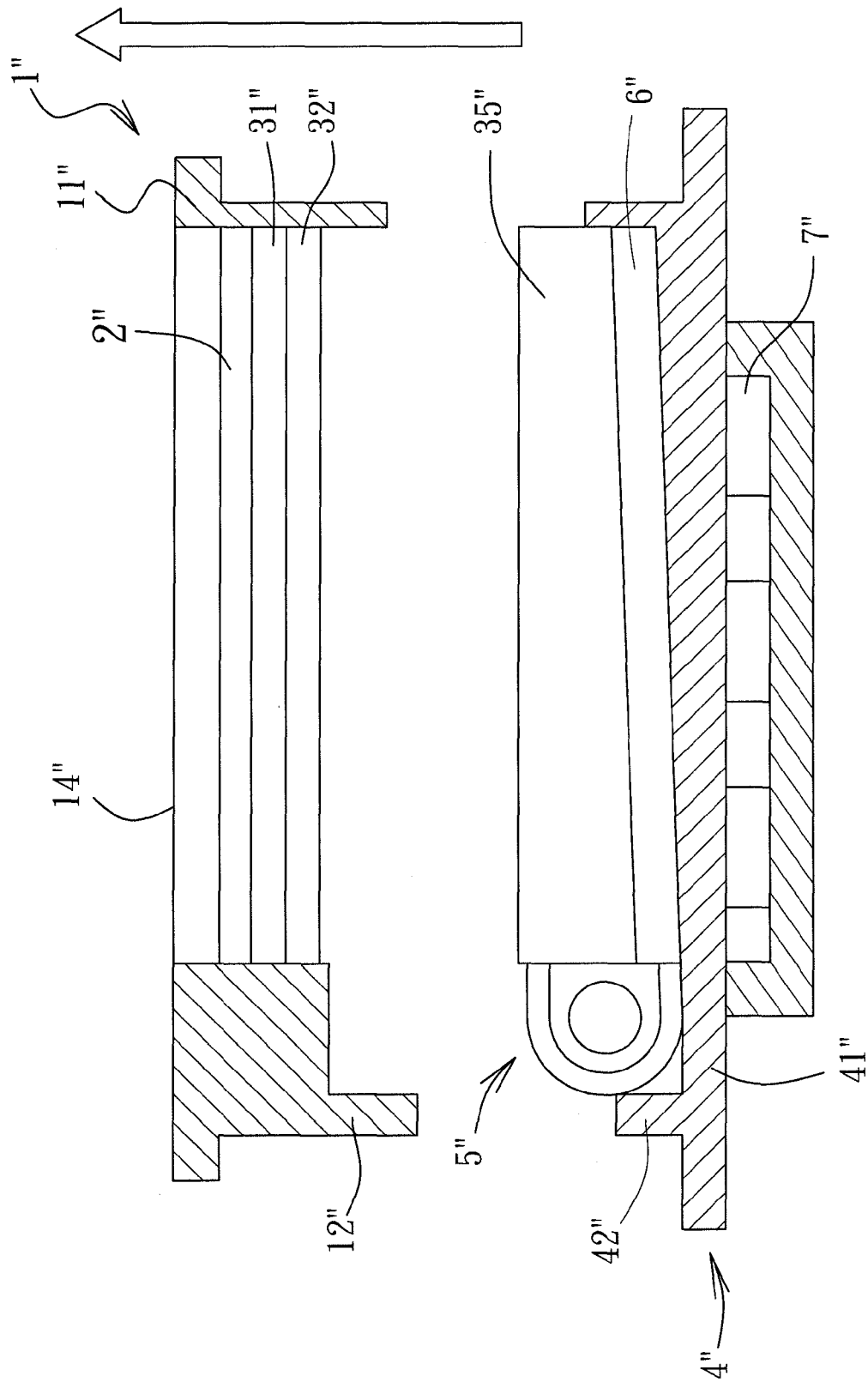
FIG. 15 is a partly exploded, partly cross-sectional schematic view illustrating another modification of the second preferred embodiment.

Referring to FIG. 15, a second modification is illustrated and is a further modification of the first modification in FIGS. 13 and 14. In the modification of FIG. 15, the optical film 31" and the light-guiding plate 35" are separated from each other. The light-guiding plate 35" and the light source 5" are disposed in a rear part (i.e., the second unit 300" in FIG. 14), and a diffuser plate 32" is additionally disposed rearwardly of the optical film 31". The diffuser plate 32" and the first surrounding wall 12" are in the tight relationship (already described in the first preferred embodiment) so as to fix the optical film 32" and the liquid crystal panel 2".

Figure 16:
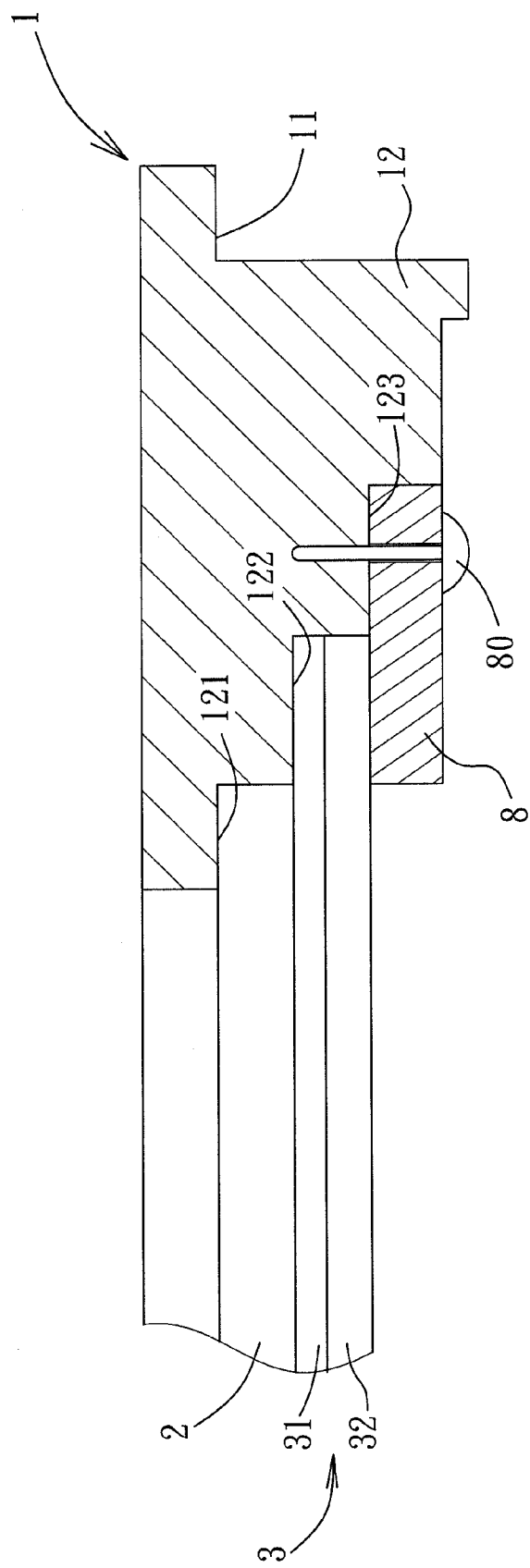
FIG. 16 illustrates a modification of a first surrounding wall shown in FIG. 5.

Referring to FIG. 16, in a third modification, an inner surface of the first surrounding wall 12 in FIG. 5 is configured to be step-shaped and cooperates with a pressing strip 8 to prevent entry of contaminants.

In particular, the inner surface of the first surrounding wall 12 is a step-shaped surface that converges in a direction toward the front frame plate 11. In this modification, the inner surface of the first surrounding wall 12 has three steps as an example, i.e., the inner surface has a first step surface section 121, a second step surface section 122, and a third step surface section 123. The liquid crystal panel 2 is disposed to abut against the first step surface section 121, and the optical plate unit 3 is disposed to abut against the second step surface section 122. Moreover, in this modification, another scheme is used to establish the sealed state between the liquid crystal panel 2 and the optical plate unit 3, i.e., the pressing strip 8 is disposed around the third step surface section 123. A part of the pressing strip 8 covers a periphery of the optical plate unit 3, and a plurality of screws 80 (only one is shown in FIG. 16) pass through the pressing strip 8 for fastening the pressing strip 8 on the third step surface section 123 to thereby press the optical plate unit 3. The optical plate unit 3 then presses the liquid crystal panel 2 to thereby prevent entry of contaminants between the liquid crystal panel 2 and the optical plate unit 3.

Figure 17:
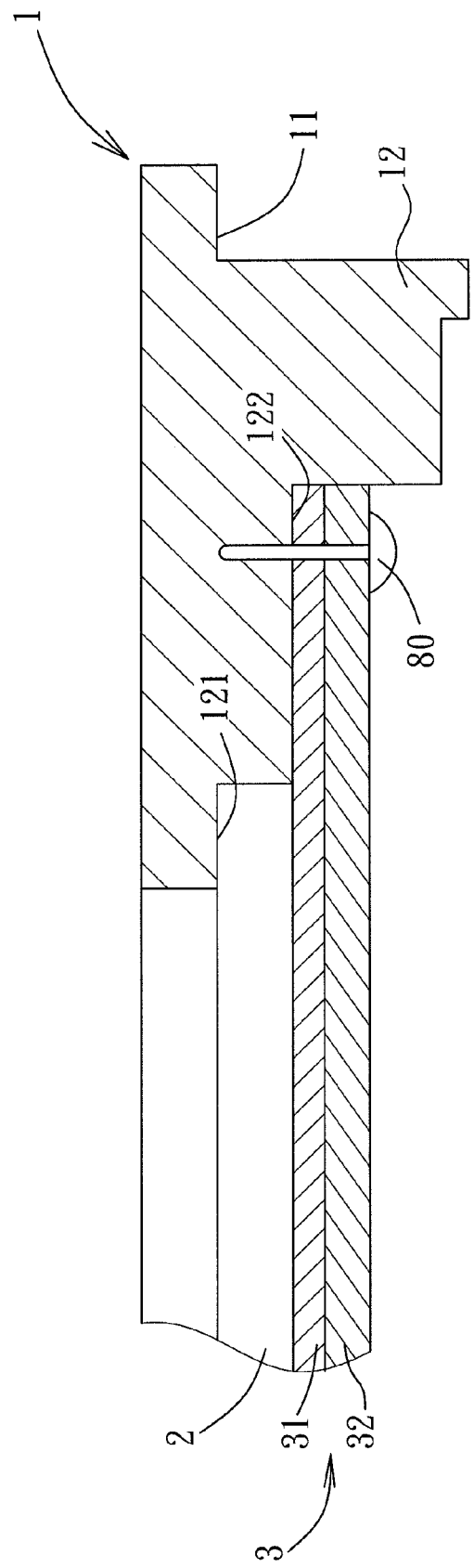
FIG. 17 illustrates another modification of the first surrounding wall shown in FIG. 5.

In practice, it is feasible to dispose the screws 80 such that they are able to pass through both the pressing strip 8 and the optical plate unit 3 to thereby fasten both on the second step surface section 122. The pressing strip 8 can be omitted, and the optical plate unit 3 can be fastened on the second step surface section 122 directly via the screws 80 to prevent entry of contaminants as shown in FIG. 17. In this case, the third step surface section 123 can be omitted.

Figure 18:
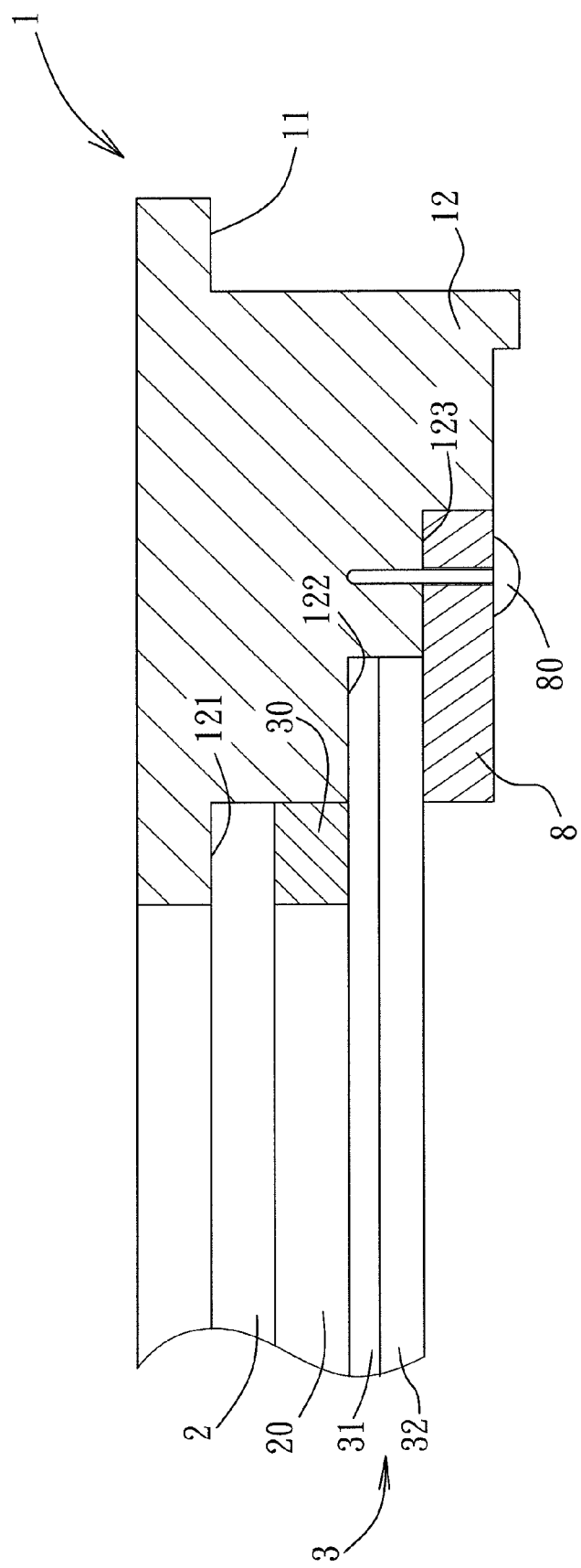
FIG. 18 is a partly cross-sectional schematic view illustrating an additional buffer disposed in a clearance.

Referring to FIG. 18, in a fourth modification, there is provided a configuration where the liquid crystal panel 2 does not contact the optical plate unit 3 to reduce the possibility of the liquid crystal panel 2 scraping the surface of the optical film 31.

The difference between the third modification in FIG. 16 and the fourth modification in FIG. 18 is that there is a clearance 20 between the liquid crystal panel 2 and the optical film 31 to separate the optical film 31 from the liquid crystal panel 2. Moreover, in order to transmit a pressure provided by the pressing strip 8 for fastening, a buffer 30 is disposed in the clearance 20 in a manner that two opposite sides of the buffer 30 abut against the liquid crystal panel 2 and the optical plate unit 3, respectively. Therefore, an effect of preventing entry of contaminants between the liquid crystal panel 2 and the optical film 31 can be achieved. Of course, if each of the liquid crystal panel 2 and the optical film 31 is in a tight relationship with the first surrounding wall 12, the buffer 30 can be omitted.

In regard to a material of the buffer 30, the buffer 30 is made of polyethylene terephthalate as an example. However, other siloxane or foam may be used.

Figure 19:
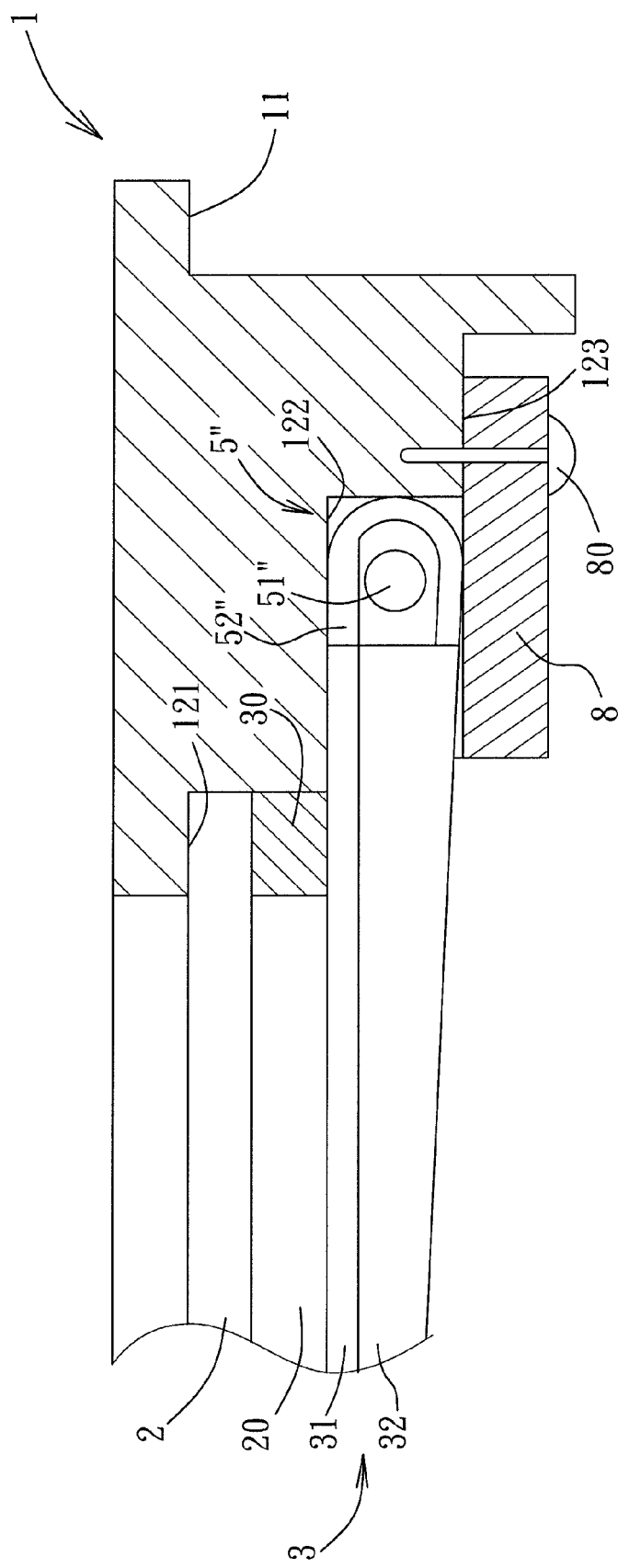
FIG. 19 is a partly cross-sectional schematic view illustrating another modification of the second preferred embodiment.

Referring to FIG. 19, a fifth modification is an integrated design of the first modification in FIG. 13 and the fourth modification in FIG. 18. In this case, the light source 5" including the fluorescent tube 51" and the reflective cover 52" is disposed on the second step surface section 122 adjacent to the optical plate unit 3. The pressing strip 8 and the screws 80 are used for pressing and fastening so as to prevent entry of contaminants.

Figure 20:
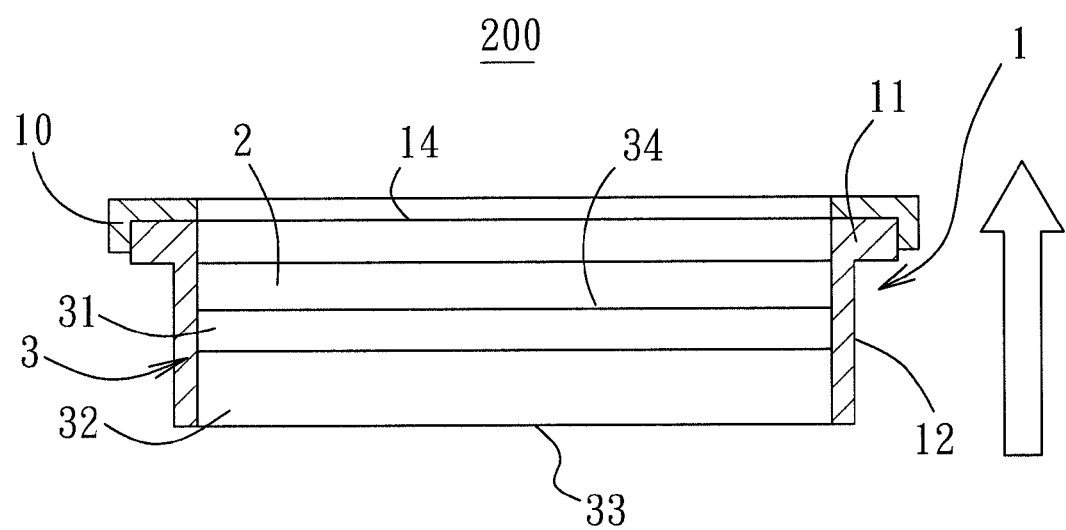
FIG. 20 is a partly cross-sectional schematic view illustrating a protective frame added to the first unit shown in FIG. 5.

Referring to FIG. 20, a sixth modification provides the front frame 1 in FIG. 5 with a protective frame 10 sleeved on one side of the front frame plate 11 of the front frame 1 opposite to the first surrounding wall 12 for protecting the front frame 1. When the protective frame 10 is worn out, it can be readily replaced with a new one. The protective frame 10 can be designed as a particular configuration, such as an animal form, for decorative purposes.

Figure 21:
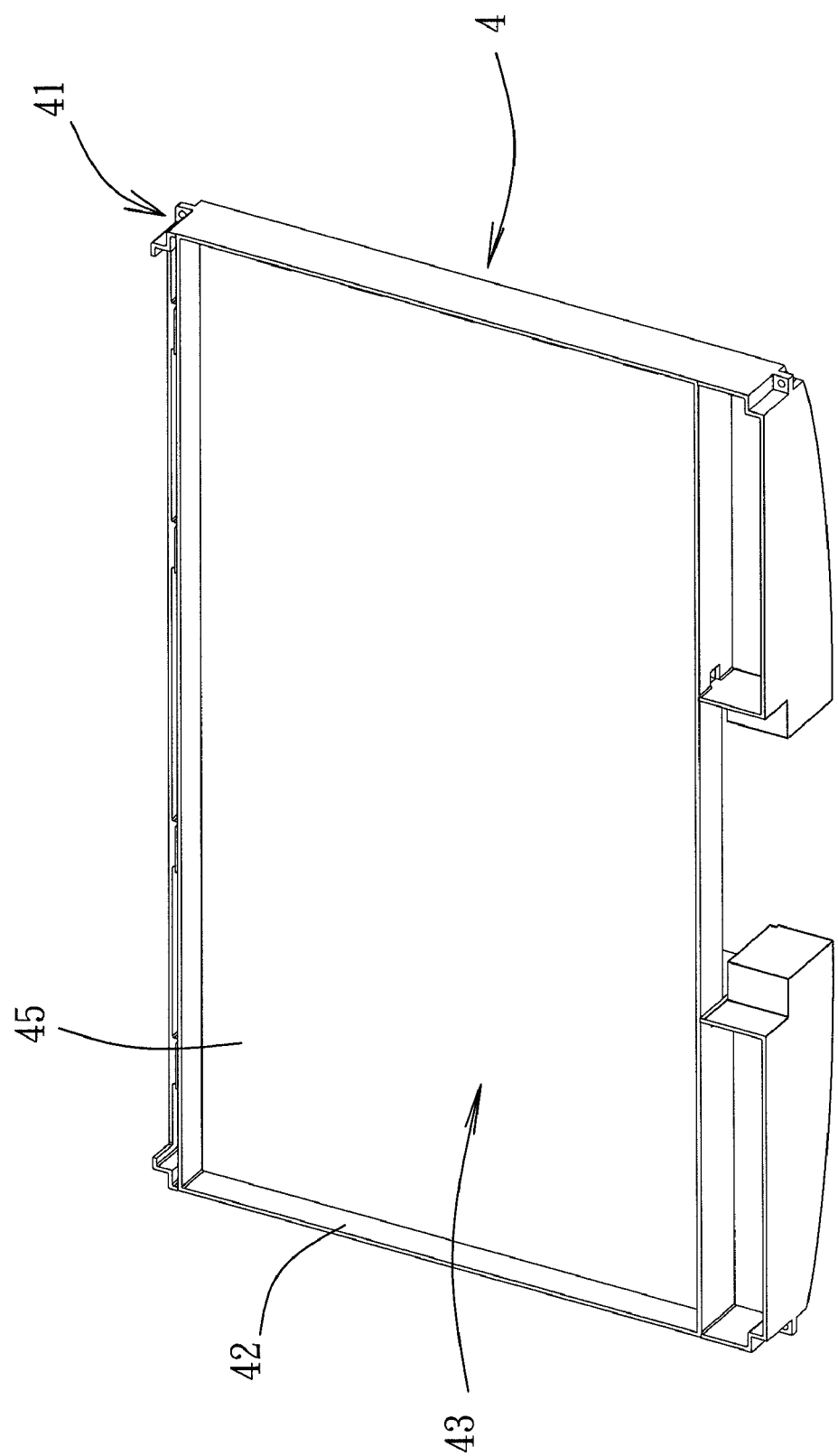
FIG. 21 is a perspective view illustrating a modification of a rear frame of the second unit shown in FIG. 7.

Referring to FIG. 21, in a seventh modification, one side (front side) of the main plate 41 of the rear frame 4 facing toward the second space 43 is a flat surface 45. The reflective sheet (not shown) can be attached to the flat surface 45, or the flat surface 45 can be coated with a reflective coating material to thereby omit the need of the reflective sheet. Aside from coating the reflective coating material on the flat surface 45, the same effect can be achieved if the rear frame 4 is made of a material capable of reflecting light.

Figure 22:
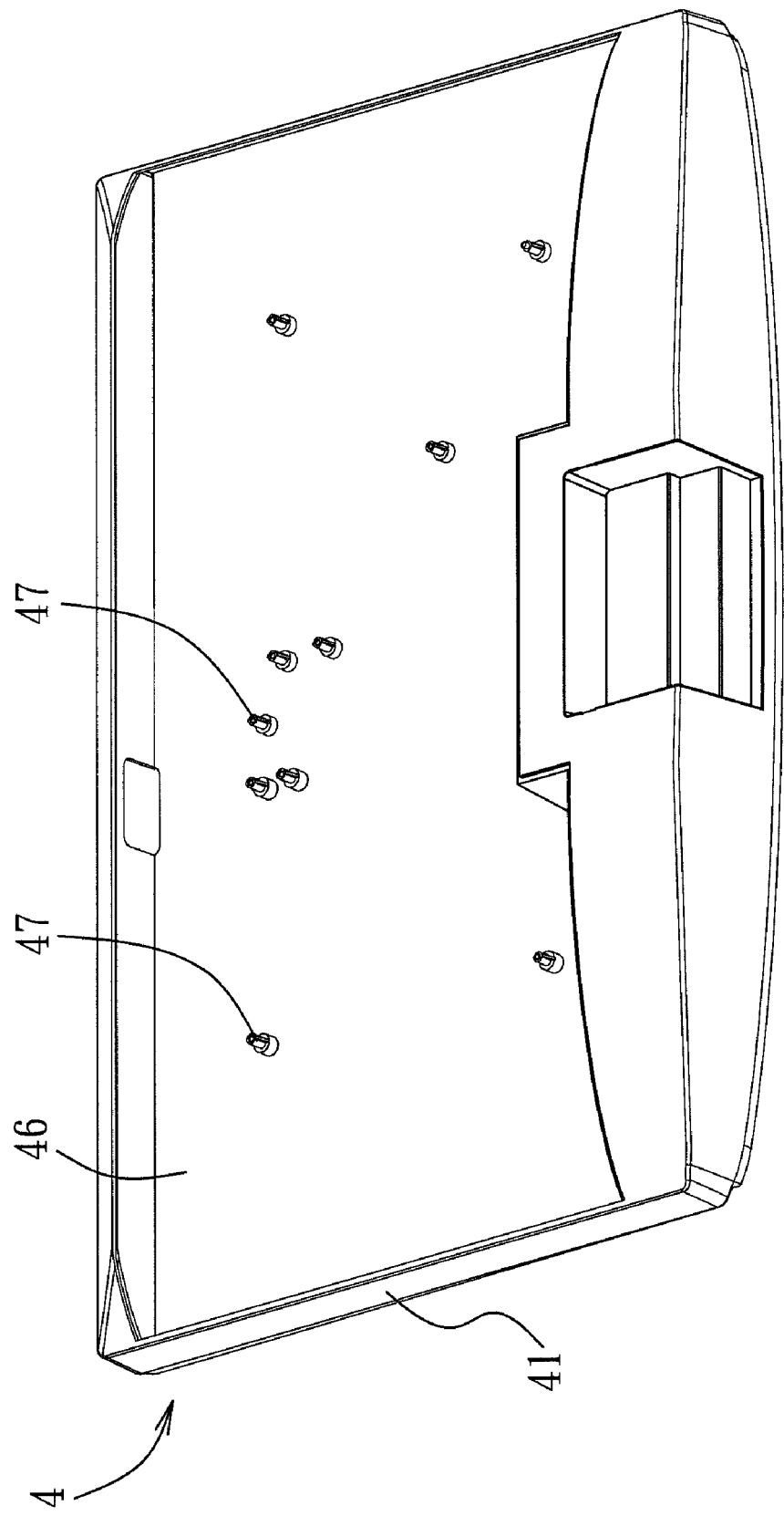
FIG. 22 is a perspective view illustrating another modification of the rear frame of the second unit shown in FIG. 7.

Referring to FIG. 22, in an eighth modification, one side of the main plate 41 of the rear frame 4 remote from the second surrounding wall 42 is formed with a groove 46. The circuit board (not shown) is disposed in the groove 46, and the cover (not shown) is designed to be capable of covering the groove 46 for protecting the circuit board. Moreover, a bottom surface of the groove 46 is provided with a plurality of fastener parts 47 for fastening the circuit board to the rear frame 4.

Moreover, it should be noted that, besides being applicable to the manufacture of the LCD device, the method of the present invention can be also applied in the manufacture of a liquid crystal module. Similarly, two major parts, i.e., a first unit 810 (shown in FIG. 23) and a second unit 820 (shown in FIG. 24), are separately assembled.

In the following description, there is described a liquid crystal module manufactured using a method similar to the method of the first preferred embodiment (direct-light-type). First, referring to FIG. 23, a module front frame 8 is provided in a dust-free environment for assembling the first unit 810. The module front frame 8 includes a front frame plate 81 formed with an opening 84, and a first surrounding wall 82 that extends backwardly from an inner periphery of the front frame plate 81. The front frame plate 81 and the first surrounding wall 82 cooperate to define a first space 83 in spatial communication with the opening 84. Then, a liquid crystal panel 2 and an optical plate unit 3 (including an optical film 31 and a diffuser plate 32) are disposed in the first space 83 in sequence, and are assembled together with the module front frame 8 to form the first unit 810 similar to the first unit 200 shown in FIG. 5.

Figure 24:
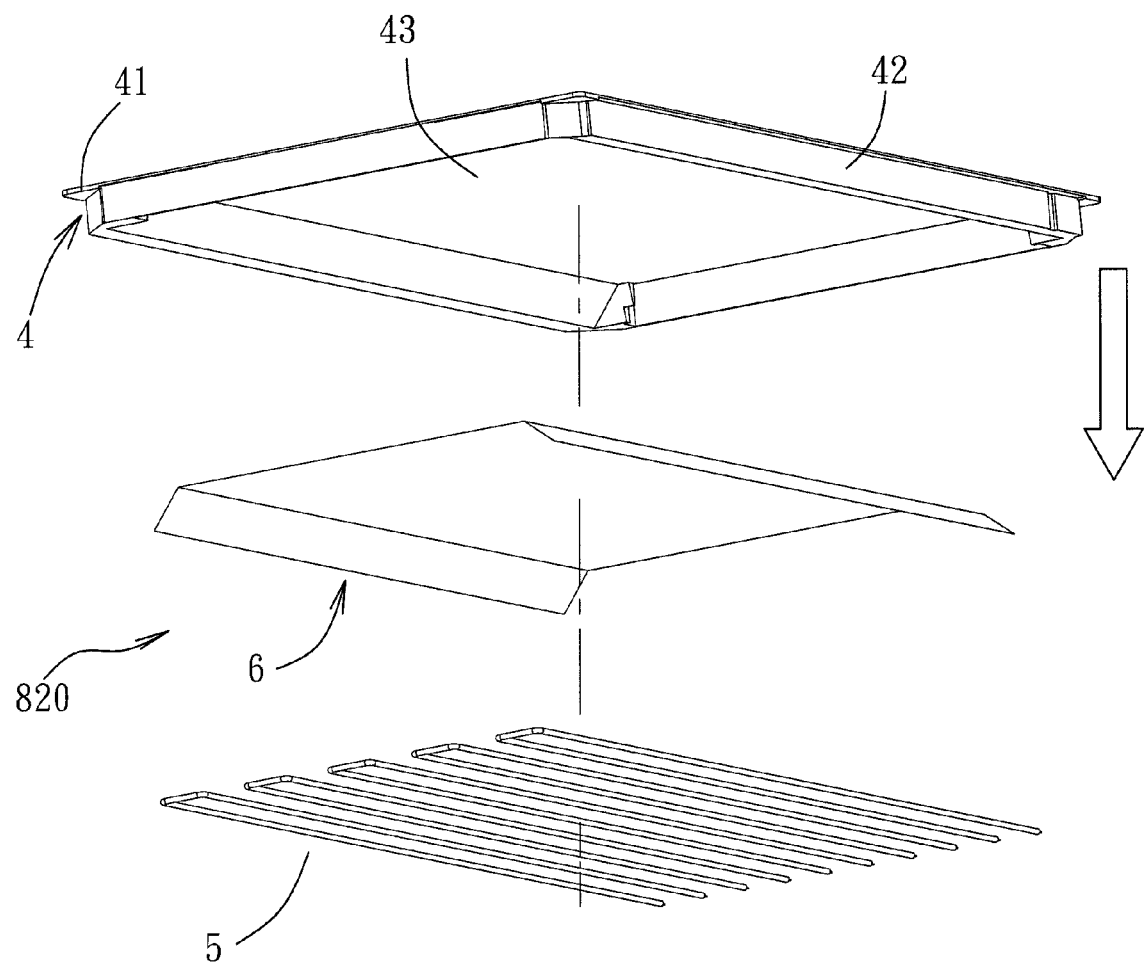
FIG. 24 is an exploded perspective view illustrating that the method for assembling the second unit as shown in FIG. 6 is applied to assemble a second unit of the liquid crystal module.

Then, referring to FIG. 24, a rear frame 4 is provided for assembling the second unit 820. The rear frame 4 includes a main plate 41, and a second surrounding wall 42 projecting from a front side of the main plate 41. The main plate 41 and the second surrounding wall 42 cooperatively define a second space 43. Then, a light source 5, a reflective sheet 6, and the rear frame 4 are assembled in sequence to form the second unit 820 similar to the second unit 300 shown in FIG. 7.

Figure 25:
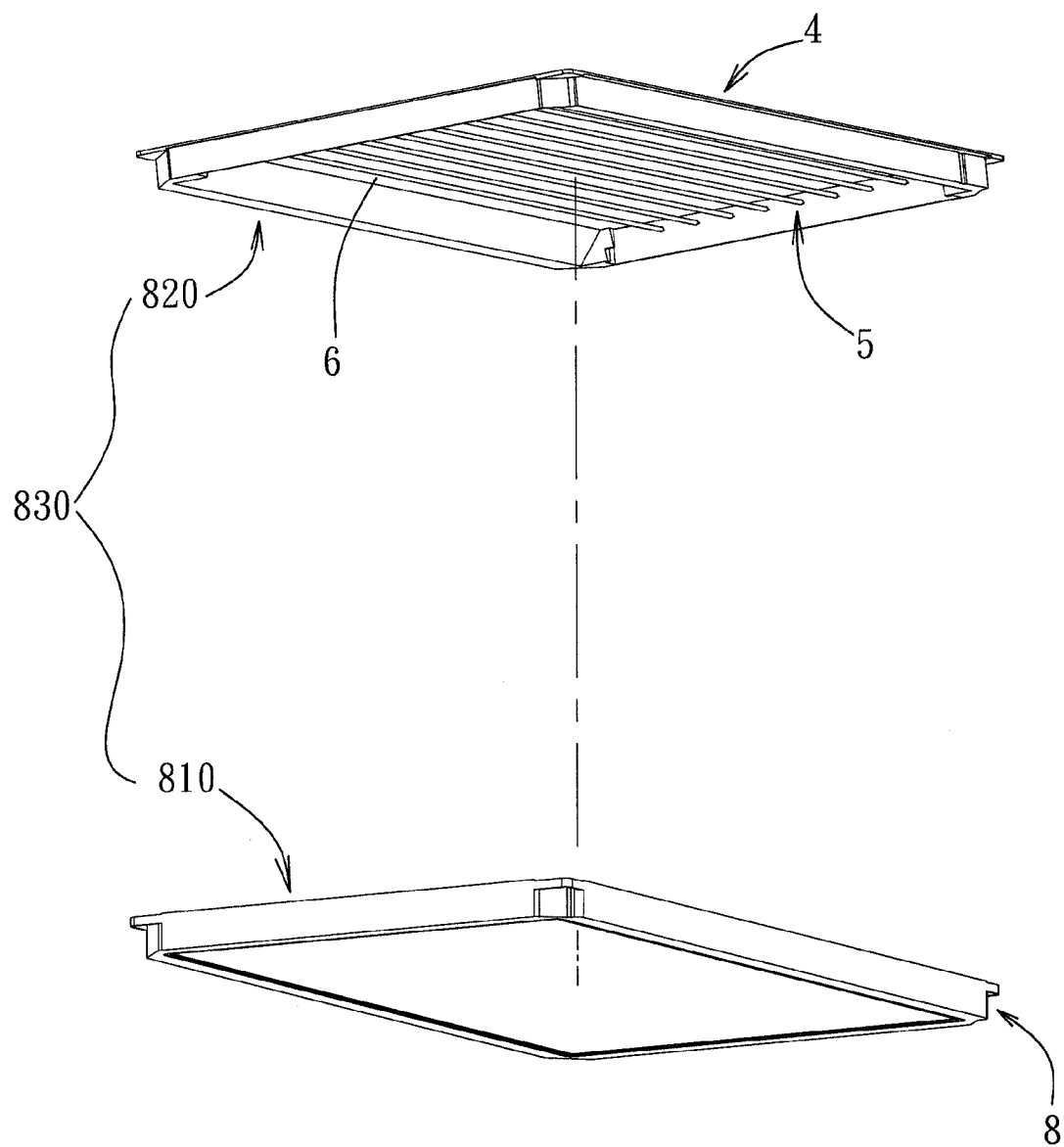
FIG. 25 is a partly exploded perspective view of the first unit and the second unit of the liquid crystal module shown in FIGS. 23 and 24.

After the first unit 810 and the second unit 820 are separately assembled, the first unit 810 and the second unit 820 can be further assembled together to form a liquid crystal module 830 as shown in FIG. 25. The procedure for assembling the liquid crystal module 830 is the same as that described in the first preferred embodiment, and will not be repeated herein for the sake of brevity. Regarding this assembly method, only the first unit 810 is assembled with a requirement of a dust-free environment. Moreover, the module front frame 8 replaces the iron frame 921 and the plastic frame 923 (shown in FIG. 1), such that the entire production procedure is simplified compared to the prior art.

Figure 26:
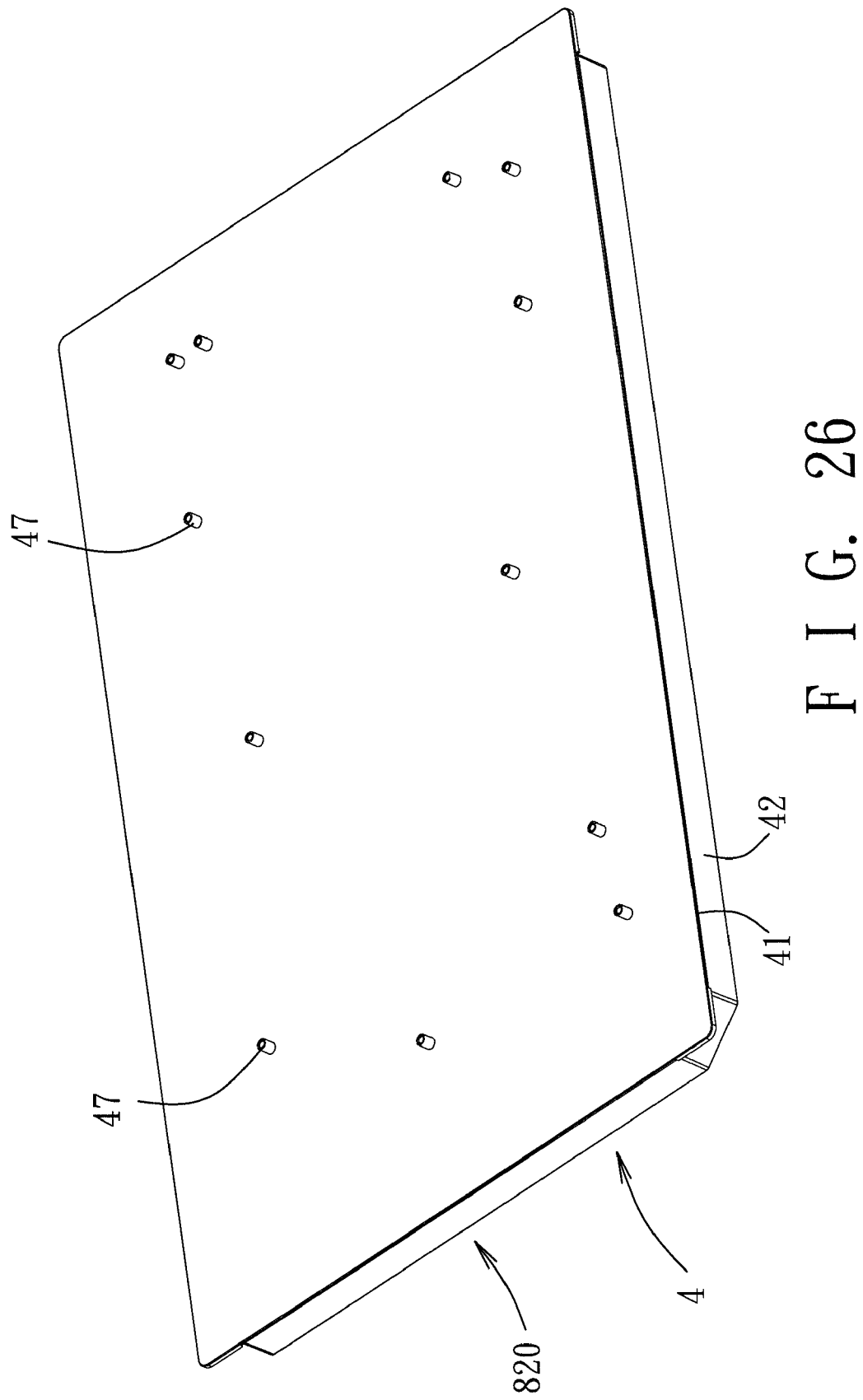
FIG. 26 is a perspective view illustrating one side of the second unit in FIG. 24 provided with a plurality of fastener parts.

Referring to FIG. 26, it should be noted that the design of the rear frame 4 of the second unit 820 is slightly different. Compared with the rear frame in FIG. 22, the design of the groove 46 is omitted, and a circuit board can be mounted directly using the fastener parts 47.

Figure 27:
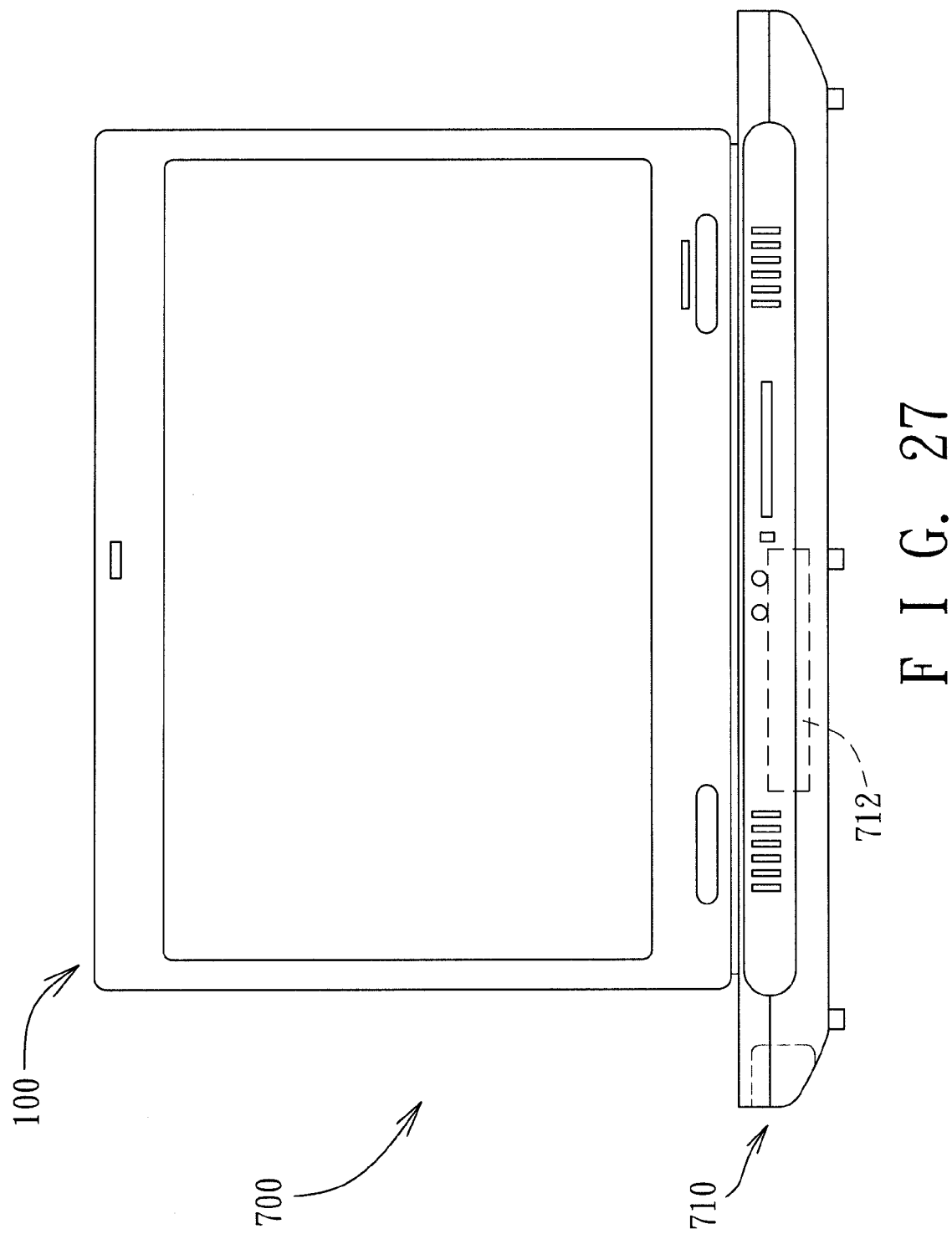
FIG. 27 is a schematic view illustrating the liquid crystal display device in FIG. 3 combined with a computer host device to form a computer system.
Figure 28:
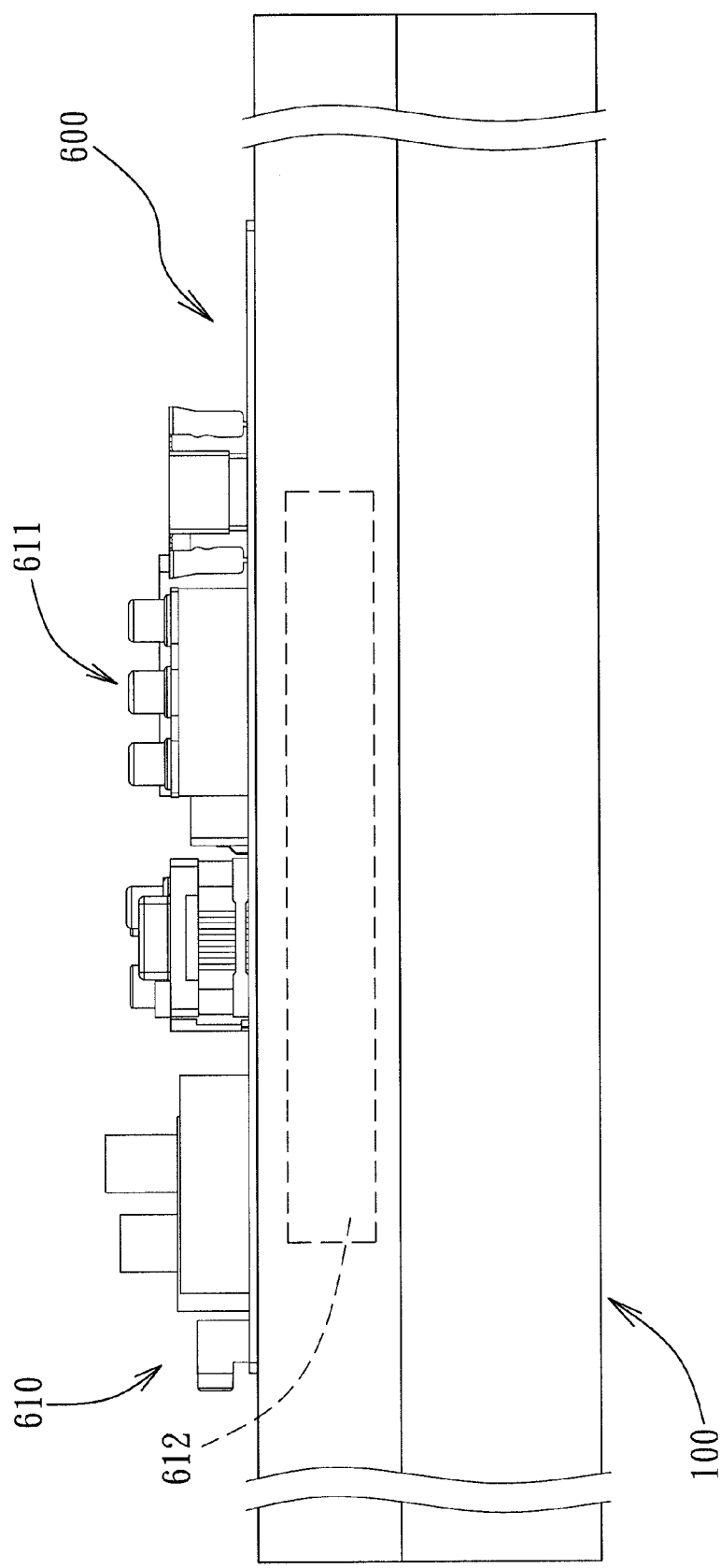
FIG. 28 is a schematic view illustrating the liquid crystal display device in FIG. 3 combined with a control module to form a liquid crystal television.

Moreover, each of the LCD devices 100, 100' and the liquid crystal module 830 can be further combined with other electronic devices to form various electronic systems. Referring to FIG. 27, as an example, the LCD device 100 can be combined with a computer host device 710 to form a computer system 700. The computer host device 710 includes a processing unit 712. The LCD device 100 is electrically connected to the host device 710 and is controlled by the processing unit 712 to show images thereon in a known manner. Referring to FIG. 28, the LCD device 100 can be combined with a control module 610 to form a liquid crystal television 600. The control module 610 includes a video interface 611 for receiving or outputting a signal, and a processing unit 612 for processing the signal. The LCD device 100 is electrically connected to the control module 610, and shows images thereon in a known manner.

Of course, the above-mentioned procedure can also refer to the method of the second preferred embodiment to assemble a side-light-type liquid crystal module. The relevant details will be omitted herein for the sake of brevity.

Figure 29:
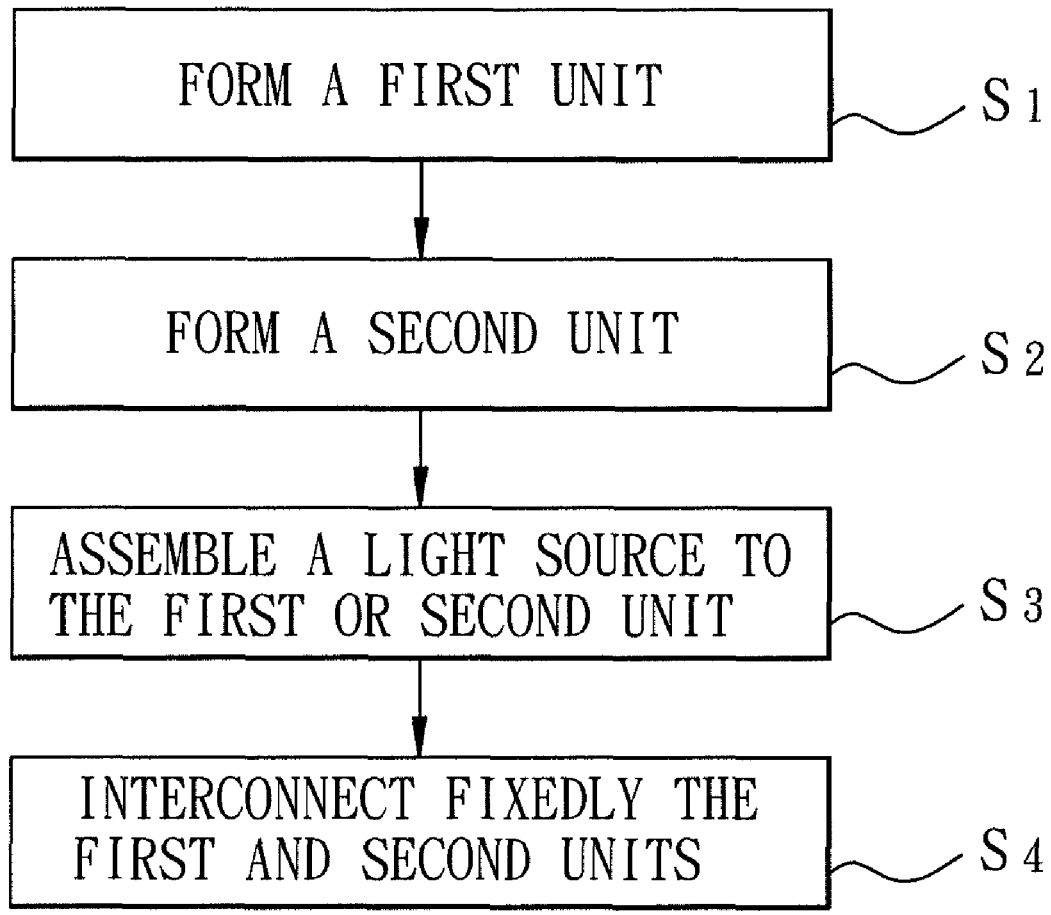
FIG. 29 is a flow chart illustrating steps of the method for assembling a liquid crystal display device according to the present invention.

In conclusion, the method for assembling a LCD device of the present invention includes four major steps as shown in FIG. 29.

Further referring to FIGS. 5, 10 and 13, step (S1) is to assemble together the front frame 1, 1', 1", the liquid crystal panel 2, 2', 2" and the optical plate unit 3, 3', 3" in a dust-free environment so as to form the first unit 200, 200', 200". The front frame 1, 1', 1" is configured with the opening 14, 14', 14". The liquid crystal panel 2, 2', 2" and the optical plate unit 3, 3', 3" are disposed in sequence at one side of the front frame 1, 1', 1" in a manner that the liquid crystal panel 2, 2', 2" closes the opening 14, 14', 14" in the front frame 1, 1', 1" and that a sealed state is established between the liquid crystal panel 2, 2', 2" and the optical plate unit 3, 3', 3". The optical plate unit 3, 3', 3" has a light-entrance surface 33, 33', 33" remote from the liquid crystal panel 2, 2', 2".

Referring to FIGS. 7, 12, 14 and 29, step (S2) is to assemble the circuit board 7, 7', 7" to one side of a rear frame 4, 4', 4" without requirement of a dust-free environment so as to form a second unit 300, 300', 300".

Referring to FIGS. 7, 12, 13 and 29, step (S3) is to assemble a light source 5, 5', 5" to the first unit 200" or the second unit 300, 300'.

Referring to FIGS. 3, 8 and 29, step (S4) is to interconnect fixedly the first unit 200, 200', 200" and the second unit 300, 300', 300" without requirement of a dust-free environment in a manner that the light source 5, 5', 5" is able to provide light to the light-entrance surface 33, 33', 33" of the optical plate unit 3, 3', 3".

In sum, in the method for assembling a LCD device of the present invention, the front frame 1, 1', 1" is used for pre-assembling the liquid crystal panel 2, 2', 2" and the optical plate unit 3, 3', 3" to form the first unit 200, 200', 200" in a dust-free environment in a manner that a sealed state is established between the liquid crystal panel 2, 2', 2" and the optical plate unit 3, 3', 3". Then, the rear frame 4, 4', 4", the reflective sheet 6, 6', 6", and the circuit board 7, 7', 7" are assembled together to form the second unit 300, 300', 300" without requirement of a dust-free environment. The light source 5, 5', 5" is assembled to the first unit 200, 200', 200" or the second unit 300, 300'. Finally, the first unit 200, 200', 200" and the second unit 300, 300', 300" are assembled together to form the LCD device 100, 100'. The part assembled with a requirement of a dust-free environment and the other part assembled without requirement of a dust-free environment can be separately assembled. Therefore, the objects of the present invention can be positively achieved.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for assembling a liquid crystal display device, comprising:
  a) assembling together a front frame, a liquid crystal panel and an optical plate unit in a dust-free environment so as to form a first unit, the front frame being configured with an opening, the liquid crystal panel and the optical plate unit being disposed in sequence at one side of the front frame in a manner that the liquid crystal panel closes the opening in the front frame and that a sealed state is established between the liquid crystal panel and the optical plate unit, the optical plate unit having a light-entrance surface remote from the liquid crystal panel;

b) assembling a circuit board to one side of a rear frame without requirement of a dust-free environment so as to form a second unit;

c) assembling a light source to one of the first and second units; and d) interconnecting fixedly the first and second units without requirement of a dust-free environment in a manner that the light source is able to provide light to the light-entrance surface of the optical plate unit.

2. The method as claimed in claim 1, wherein the optical plate unit further has a light-exit surface that is attached to the liquid crystal panel, and in step a), the light-exit surface and the liquid crystal panel are in a tight relationship with each other so as to result in the sealed state between the optical plate unit and the liquid crystal panel, wherein the weight of one of the optical plate unit and the liquid crystal panel acts on the other one of the optical plate unit and the liquid crystal panel such that the light-exit surface and the liquid crystal panel are in a tight relationship at least at peripheral portions thereof.

3. The method as claimed in claim 1, wherein the front frame includes a front frame plate and a first surrounding wall extending from one side of the front frame plate, the opening being formed in the front frame plate, the front frame plate and the first surrounding wall cooperating to define a first space for accommodating the liquid crystal panel and the optical plate unit, the first surrounding wall being in a tight relationship with a periphery of the optical plate unit to result in the sealed state between the liquid crystal panel and the optical plate unit.

4. The method as claimed in claim 3, wherein the optical plate unit includes a light-guiding plate and further has a light-exit surface facing the liquid crystal panel, the light-entrance surface being formed on a side of the light-guiding plate and being substantially perpendicular to the light-exit surface, the light source being adjacent to the light-entrance surface when the first and second units are interconnected.

5. The method as claimed in claim 3, wherein the light source includes a light-emitting component, the optical plate unit including a diffuser plate and further having a light-exit surface that faces the liquid crystal panel, the light-entrance surface being formed on a side of the diffuser plate remote from the liquid crystal panel and being substantially parallel to the light-exit surface, the light source being disposed proximate to the light-entrance surface when the first and second units are interconnected.

6. The method as claimed in claim 3, wherein the first surrounding wall has an inner surface that is stepped, that converges in a direction toward the front frame plate, and that has a first step surface section and a second step surface section, the liquid crystal panel being disposed to abut against the first step surface section, the optical plate unit being disposed to abut against the second step surface section.

7. A liquid crystal display device comprising:

a front frame including a front frame plate formed with an opening, and a first surrounding wall that extends from one side of said front frame plate, said front frame plate and said first surrounding wall cooperating to define a first space;

a liquid crystal panel that is received in said first space and that closes said opening in said front frame plate;

an optical plate unit that has a light-entrance surface and a light-exit surface and that is received in said first space in a manner that said light-exit surface faces said liquid crystal panel, a periphery of said optical plate unit forming a tight relationship with said first surrounding wall, the weight of one of said optical plate unit and said liquid crystal panel acting on the other one of said optical plate unit and said liquid crystal panel such that said light-exit surface and said liquid crystal panel are in a tight relationship at least at peripheral portions thereof;

a rear frame that is connected to one end of said first surrounding wall of said front frame, and that includes a main plate;

a circuit board disposed on one side of said main plate opposite to said front frame; and a light source disposed adjacent to said light-entrance surface for providing light toward said light-entrance surface.

8. The liquid crystal display device as claimed in claim 7, wherein said rear frame further includes a second surrounding wall extending from one side of said main plate opposite to said circuit board, said one end of said first surrounding wall being connected fixedly to one end of said second surrounding wall to interconnect said front frame and said rear frame.

9. The liquid crystal display device as claimed in claim 8, wherein said optical plate unit includes a light-guiding plate, said light-entrance surface being formed on a side of said light-guiding plate and being substantially perpendicular to said light-exit surface, at least a portion of said light-entrance surface being spaced apart from said first surrounding wall to form a clearance therewith, at least a portion of said light source being disposed in said clearance between said light-entrance surface and said first surrounding wall.

10. The liquid crystal display device as claimed in claim 8, wherein said main plate and said second surrounding wall cooperatively define a second space, said light source being fixed in said second space, at least a part of said light-entrance surface extends into said second space, said light source being disposed between said light-entrance surface and said second surrounding wall.

11. The liquid crystal display device as claimed in claim 7, wherein said first surrounding wall has an inner surface that is stepped, that converges in a direction toward said front frame plate, and that has a first step surface section and a second step surface section, said liquid crystal panel being disposed to abut against said first step surface section, said optical plate unit being disposed to abut against said second step surface section.

12. A sub-assembly of a liquid crystal display device, comprising:

a front frame including a front frame plate formed with an opening, and a first surrounding wall that extends from one side of said front frame plate, said front frame plate and said first surrounding wall cooperatively defining a first space;

a liquid crystal panel that is received in said first space and that closes said opening in said front frame plate; and an optical plate unit that has a light-entrance surface and a light-exit surface and that is received in said first space in a manner that said light-exit surface faces said liquid crystal panel, a periphery of said optical plate unit forming a tight relationship with said first surrounding wall.

13. The sub-assembly of a liquid crystal display device as claimed in claim 12, wherein said optical plate unit includes a light-guiding plate, said light-entrance surface being formed on one side of said light-guiding plate and being substantially perpendicular to said light-exit surface, a part of said light-entrance surface being spaced apart from said first surrounding wall.

14. The sub-assembly of a liquid crystal display device as claimed in claim 13, wherein at least a part of said light-entrance surface of said optical plate unit projects out of said first space.

15. The sub-assembly of a liquid crystal display device as claimed in claim 12, wherein said optical plate unit includes a diffuser plate, said light-entrance surface being formed on one side of said diffuser plate remote from said liquid crystal panel, and being substantially parallel to said light-exit surface.

16. The sub-assembly of a liquid crystal display device as claimed in claim 12, wherein said optical plate unit includes an optical film adjacent to said liquid crystal panel, said light-exit surface being formed on one side of said optical film that faces said liquid crystal panel.

17. The sub-assembly of a liquid crystal display device as claimed in claim 12, further comprising a protective frame sleeved on one side of said front frame plate of said front frame opposite to said first surrounding wall.

* * * * *